(12) United States Patent
Maeda

(10) Patent No.: US 8,438,331 B2
(45) Date of Patent: May 7, 2013

(54) RECORDING SYSTEM, RECORDING METHOD, INFORMATION PROCESSING APPARATUS, INFORMATION PROCESSING CONTROL METHOD, RECORDING CONTROL DEVICE, AND RECORDING CONTROL METHOD

(75) Inventor: Satoshi Maeda, Kanagawa (JP)

(73) Assignee: Sony Corporation, Tokyo (JP)

(*) Notice: Subject to any disclaimer, the term of this patent is extended or adjusted under 35 U.S.C. 154(b) by 1663 days.

(21) Appl. No.: 11/840,667

(22) Filed: Aug. 17, 2007

(65) Prior Publication Data

US 2008/0050089 A1   Feb. 28, 2008

(30) Foreign Application Priority Data

Aug. 21, 2006   (JP) ................. 2006-224507

(51) Int. Cl.
*G06F 12/00*   (2006.01)

(52) U.S. Cl.
USPC ............... 711/112; 711/E12.028; 707/822; 707/823; 707/828

(58) Field of Classification Search .................. 711/112; 707/822, 823, 828
See application file for complete search history.

(56) References Cited

U.S. PATENT DOCUMENTS
6,577,325 B1   6/2003   Tadokoro et al.

FOREIGN PATENT DOCUMENTS
| JP | 11-134766 | 5/1999 |
| JP | 2000-173154 | 6/2000 |
| JP | 2002-124010 | 4/2002 |

*Primary Examiner* — Reginald Bragdon
*Assistant Examiner* — Hamdy S Ahmed
(74) *Attorney, Agent, or Firm* — Oblon, Spivak, McClelland, Maier & Neustadt, L.L.P.

(57) ABSTRACT

A recording system includes a recording device, an information processing apparatus, a recording control unit, and an information processing control unit. The recording control unit manages data files recoded on first recording media and a second recording medium using a directory structure having directories of first recording media and a directory, serving as an entry folder, of the second recording medium under a root directory, selects, in response to a data file and an information file detailing category information being written in the entry folder, a first recording medium based on the category information, and controls the recording device to record the selected data file on the selected medium. The information processing control unit controls, in response to a data file and category information being specified, a writing operation so that the specified data file and the information file are written in the entry folder.

14 Claims, 12 Drawing Sheets

| DISC ID | REMAINING CAPACITY | LAST ACCESS DATE | HOUSING LOCATION (Bin NUMBER) | CATEGORY INFORMATION | STORED FILE NAME |
|---------|--------------------|--------------------|-------------------------------|----------------------|------------------|
|         |                    |                    |                               |                      |                  |
|         |                    |                    |                               |                      |                  |
| ..... | ..... | ..... | ..... | ..... | ..... |
|         |                    |                    |                               |                      |                  |

RECORDING SYSTEM, RECORDING METHOD, INFORMATION PROCESSING APPARATUS, INFORMATION PROCESSING CONTROL METHOD, RECORDING CONTROL DEVICE, AND RECORDING CONTROL METHOD

CROSS REFERENCES TO RELATED APPLICATIONS

The present invention contains subject matter related to Japanese Patent Application JP 2006-224507 filed in the Japanese Patent Office on Aug. 21, 2006, the entire contents of which are incorporated herein by reference.

BACKGROUND OF THE INVENTION

1. Field of the Invention

The present invention particularly relates to a recording system and a recording method preferably applicable to writing of data files on recording media that are housed in a media housing unit capable of housing a plurality of recording media. In addition, the present invention relates to an information processing apparatus and a recording control device that constitute such a recording system, an information processing control method, and a recording control method.

2. Description of the Related Art

Broadcasters and program creators of television broadcasting have accumulated broadcasted audio visual (AV) contents and other contents on predetermined recording media, and have archived the contents as data (hereinafter, such an action is also referred to as "archiving").

FIG. 1 is referred to in order to describe a known archiving system used for such archiving.

As shown in FIG. 1, an archiving system includes a cart control device 3, a personal computer (PC) 4, a server 6, and a cart 2. The cart control device 3, the PC 4, and the server 6 are connected to each other through a predetermined network 5, e.g., Ethernet, so as to be able to perform data communication. In addition, the cart control device 3 controls operations of the cart 2.

The server 6 serves as a storage area of AV contents to be archived. The server 6 may be, for example, a server called an on-air server for storing AV contents of broadcasting programs or a non-linear editing device for storing AV contents of edited materials.

In addition, the cart 2 includes a disc housing unit for housing a plurality of optical discs therein, and decks for recording and playing back contents on the optical discs. Accordingly, the cart 2 is capable of performing recording and playback operations on the optical discs housed in the disc housing unit.

Additionally, the cart control device 3 functions as a data interface unit to and a control unit for the cart 2. More specifically, the cart control device 3 receives data write instructions given to the cart 2 from external devices. The cart control device 3 also selects and instructs a deck to be used and a disc to be used included in the cart 2 according to such write instructions.

The cart control device 3 manages information on a remaining capacity of each optical disc housed in the cart 2, and on a housing location of each optical disc in the disc housing unit. With this information, the cart control device 3 selects an optical disc capable of storing the data on the basis of the size of data writing of which is instructed (hereinafter, referred to as writing-instructed data), and gives the cart 2 instructions about the housing location of the selected optical disc and a deck to be used.

The cart 2, in turn, transports and loads the optical disc housed at the housing location instructed by the cart control device 3 in such a manner to the instructed deck to cause the deck to write the writing-instructed data.

In such an archiving system, AV contents stored in the server 6 are written on optical discs housed in the cart 2. The PC 4 serves as a user interface unit when the contents stored in the server 6 are written on the optical discs housed in the cart 2 in this manner.

The PC 4 grasps a storage status of AV contents stored in the server 6 and a storage status of AV contents stored on each optical disc housed in the cart 2. Thus, the PC 4 can display, on a display screen, graphical user interfaces (GUIs) presenting a list of AV contents stored in the server 6 and a list of AV contents stored on the optical discs housed in the cart 2 (see, for example, FIG. 7A).

Users, such as operators, can give an instruction to write the selected AV content in the cart 2 by selecting an AV content included in the list for the server 6 on the GUI displayed in this manner, and performing a drag and drop operation to move an indicator representing the selected AV content to, for example, the list for the cart 2.

In response to this instruction, the PC 4 instructs the server 6 to transfer the selected AV content to the cart control device 3. The PC 4 also instructs the cart control device 3 to write the AV content transferred thereto in this manner on an optical disc housed in the cart 2.

The cart control device 3, in turn, checks the size of the write-instructed AV content, and selects an optical disc capable of storing the AV content from those having a free space housed in the cart 2. The cart control device 3 gives the cart 2 an instruction about the housing location of the selected optical disc in the disc housing unit and the deck to be used, thereby causing the instructed optical disc to be transported and loaded to the instructed deck of the cart 2.

Thereafter, the cart control device 3 instructs the cart 2 to write the write-instructed AV content on the optical disc with the instructed deck.

SUMMARY OF THE INVENTION

Such an archiving system is expected to write AV contents on each optical disc after categorizing the AV contents according to subjects thereof. For example, regarding an AV content of a sport program, the AV content is written on an optical disc assigned to a sport program category.

At this time, it is not preferable to store contents belonging to different categories on one optical disc. Accordingly, for example, it is preferable to write contents belonging to a category A on one optical disc thereafter, once a content belonging to the category A is recorded on the disc.

To write contents belonging to a category on an optical disc assigned to the same category, the following procedure is adoptable. Firstly, whether or not discs assigned to the same category as that of the instructed content exist is determined in response to a content write instruction.

If the optical discs assigned to the same category exist, whether or not an optical disc, among them, having an enough remaining capacity to write the write-instructed content exists is determined. If such an optical disc exists, the write-instructed content is written on the optical disc.

In addition, at this time, it is preferable to categorize each optical disc after identifying the category of the write-instructed content. More specifically, if the category of each optical disc is determined before issuance of a content write instruction, frequency in the use of optical discs housed in the cart 2 may vary, like, for example, there are many instructions to write contents belonging to a category A while a capacity of an optical disc for another category B is excessive. As a result, inconvenience, such as necessity for frequent exchange of optical discs in the cart 2, may occur.

Thus, preferably, optical discs are categorized after issuance of a write instruction and identification of a category of the write-instructed content so as to allow the optical discs housed in the cart 2 to be used evenly.

When the above-described category-based data file writing is assumed, the cart control device 3 of the above-described known archiving system does not have such a function to write contents on a category-by-category basis. In this case, the PC 4 specifies a category of a data file to be written. Therefore, to realize such a category-based data file writing function in the archiving system, the PC 4 manages remaining capacities of optical discs assigned to the above-described categories, and selects an optical disc depending on the remaining capacities.

However, this undesirably increases processing loads of the PC 4 at the time of writing of contents in the cart 2 when compared with the current processing loads. As is understandable from the foregoing description, the PC 4 also executes processing for giving instructions to the server 6 at the time of writing contents in the cart 2. To take this processing load into account, it is preferable to reduce the processing loads of the PC 4 as much as possible.

In view of the above-described disadvantages, a recording system according to an embodiment of the present invention is configured as described below.

More specifically, according to an embodiment of the present invention, a recording system at least including a recording device having a media housing unit capable housing a plurality of first recording media and a recording unit configured to perform a recording operation on the first recording media, and an information processing apparatus includes a recording control unit provided at least outside of the information processing apparatus and an information processing control unit provided in the information processing apparatus. The recording control unit manages, using a directory structure having a directory representing each of the first recording media housed in the media housing unit and a directory, serving as an entry folder, representing a second recording medium, data files on each of the first recording media and on the second recording medium under a root directory of a volume constituted by the first recording media housed in the media housing unit and the second recording medium to which a data file to be recorded on the first recording media is registered. The recording control unit executes, in response to a predetermined data file and an information file for detailing category information being written in the entry folder, processing for selecting a predetermined first recording medium from the plurality of the first recording media housed in the media housing unit on the basis of the category information detailed by the information file, and also executes processing for controlling the recording device so that the data file written in the entry folder is recorded on the selected first recording medium.

The information processing control unit executes, in response to the data file and the category information being specified, processing for controlling a writing operation so that the specified data file and the information file for detailing the specified category information are written in the entry folder.

According to the above-described embodiment of the present invention, data files are recorded on the first recording media housed in the media housing unit after being categorized into a predetermined category. In response to a data file and category information thereof being specified, the information processing device performs a control operation so that the specified data file and the information file for detailing the specified category information are written in a predetermined directory serving as the entry folder that is managed by the external recording control unit. In response to this file writing operation, the recording control unit selects a predetermined first recording medium from the first recording media housed in the media housing unit on the basis of the category information detailed by the information file, and controls the recording device so that the specified data file is recorded on the selected first recording medium.

With this configuration, the information processing apparatus has only to write the specified data file and the category information (i.e., the information file) in a predetermined directory serving as the entry folder to record data files on the first recording media housed in the media housing unit after categorizing the data files into a predetermined category. Thus, processing loads of the information processing apparatus can be reduced when compared with a case where, for example, the information processing apparatus selects a first recording medium on which a data file is written on the basis of the specified category information.

BRIEF DESCRIPTION OF THE DRAWINGS

FIG. 6 is a diagram illustrating a data structure of management information stored in a recording control device according to an embodiment of the present invention;

DESCRIPTION OF THE PREFERRED EMBODIMENTS

Preferred embodiments (hereinafter, referred to as embodiments) for carrying out the present invention will be described below.

[Overview of System]

Figure 1:
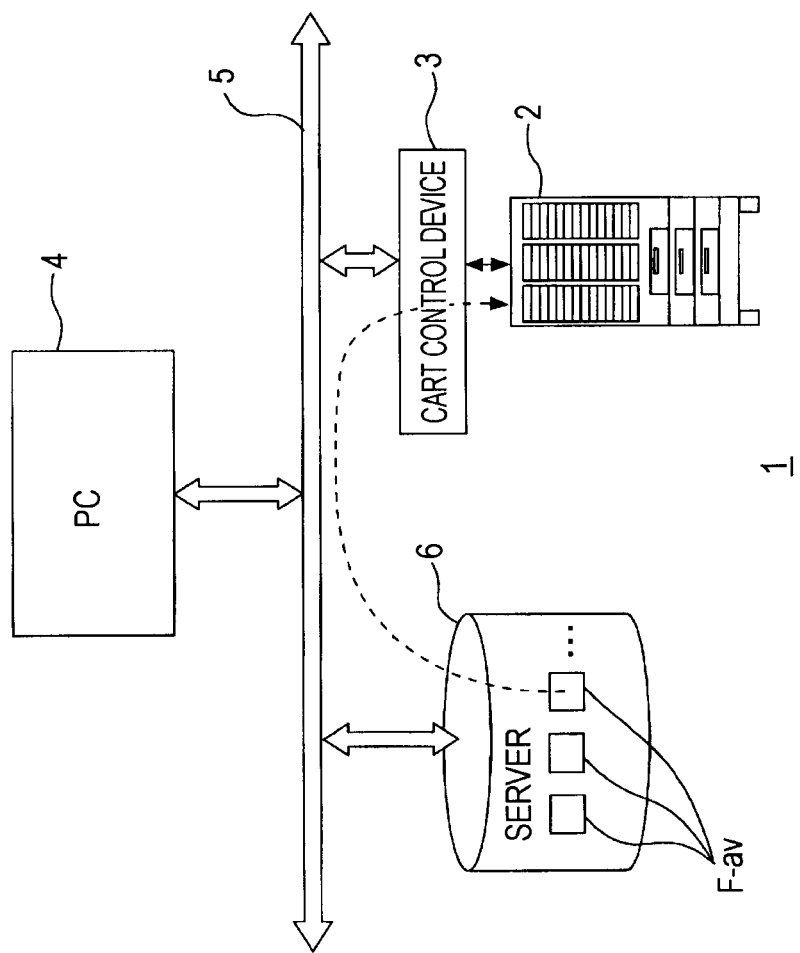
FIG. 1 is a diagram illustrating an overview of a recording system according to an embodiment of the present invention.

FIG. 1 illustrates an overview of an archiving system 1 serving as a recording system according to an embodiment of the present invention.

Referring to FIG. 1, the archiving system 1 is a business system constructed for accumulating audio visual (AV) contents of, particularly, television broadcasting programs on predetermined recording media, and for archiving the contents as data (hereinafter, such an action is also referred to as "archiving").

As shown in FIG. 1, the archiving system 1 at least includes a cart 2, a cart control device 3, a personal computer (PC) 4, and a server 6.

In this archiving system 1, the cart control device 3, the PC 4, and the server 6 are connected to each other so as to be able to perform data communication through a network 5, such as, for example, Ethernet. In addition, the cart 2 is connected to the cart control device 3 so as to be able to perform data communication.

The cart 2 includes a disc housing unit (e.g., a disc housing unit 25) and record/playback decks (e.g., decks 26-1 to 26-3, which will also be described later). The disc housing unit houses a plurality of optical disc recording media (e.g., discs D, which will be described later) therein. The record/playback decks perform recording and playback operations regarding the optical disc recording media housed in the disc housing unit. The cart 2 records and plays back data on an instructed optical disc recording medium.

In addition, the cart control device 3 functions as a data interface unit for external devices (in this case, particularly, the PC 4) connected thereto through the network 5 to access the cart 2, and also functions as a control unit for the cart 2. More specifically, the cart control device 3 receives data write instructions given from external devices to the cart 2, and selects and instructs a deck to be used and a disc to be used contained in the cart 2 according to the write instructions.

The server 6 functions as a storage device for storing AV contents (e.g., AV files F-av shown in FIG. 1) to be recorded on optical discs D housed in the cart 2. The server 6 may be, for example, a server called an on-air server for storing AV contents of broadcasting programs or a non-linear editing device for storing AV contents of edited materials.

In addition, in this archiving system 1, the PC 4 functions as a user interface unit at the time of writing, on an optical disc housed in the cart 2, AV contents stored in the server 6. To realize such a user interface function, an archive application 50a, which will be described later, is installed in the PC 4. As described below, lists regarding AV files F-av stored in the server 6 and regarding AV files F-av recorded on each optical disc D housed in the disc housing unit 25 of the cart 2 are created according to the archive application 50a. On the basis of these lists, users can grasp the AV files F-av stored in the server 6 and in the cart 2.

Users perform input operations according to instructions displayed on the screen after launching such an archive application 50a, thereby being able to write the AV file F-av stored in the server 6 on a predetermined optical disc D housed in the cart 2.

[Configurations of Recording Device]

Figure 2:
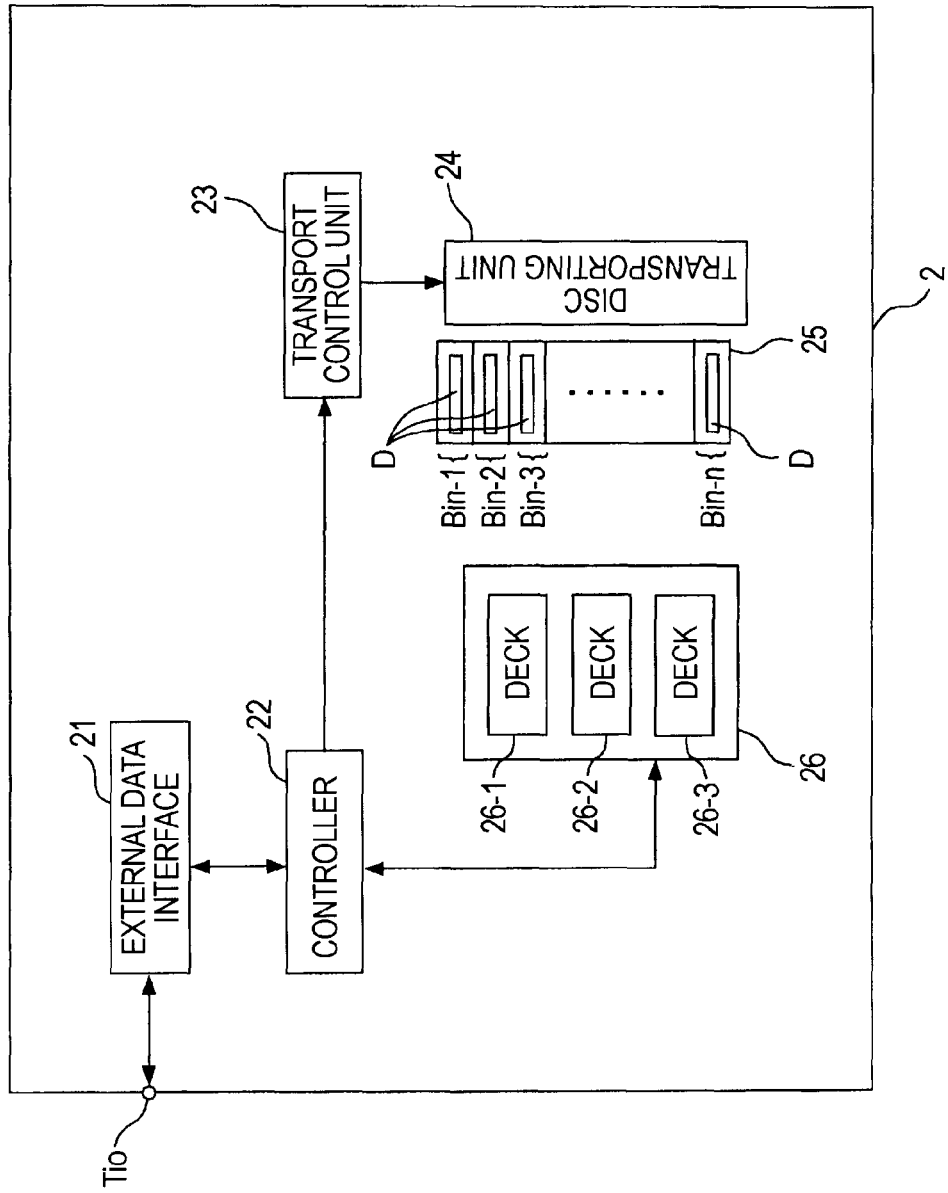
FIG. 2 is a block diagram illustrating an internal configuration of a recording device according to an embodiment of the present invention.

FIG. 2 is a block diagram illustrating an internal configuration of the cart 2 shown in FIG. 1.

The cart 2 includes a disc housing unit 25 capable of housing a plurality of optical discs D. The disc housing unit 25 has a plurality of housing slots Bins, i.e., housing slots Bin-1 to Bin-n, as shown in FIG. 2. Each housing slot Bin can house an optical disc D.

The cart 2 also includes a record/playback unit 26. As shown in FIG. 2, the record/playback unit 26 includes a plurality of decks 26-1, 26-2, and 26-3 for actually performing recording and playback operations for optical discs D.

The record/playback unit 26 can receive data to be recorded supplied from a controller 22, which will be described later, and can supply data played back by the decks 26-1 to 26-3 to the controller 22.

A disc transporting unit 24 transports and loads the optical discs housed in the housing slots Bin of the disc housing unit 25 to the decks 26-1 to 26-3 of the record/playback unit 26, and returns the optical discs D ejected from the decks 26-1 to 26-3 to the housing slots Bin. Although the illustration is omitted, this disc transporting unit 24 includes a mechanical portion for allowing transport of the optical discs D between each housing slot Bin of the disc housing unit 25 and the decks 26-1 to 26-3 of the record/playback unit 26, and a driving motor for driving the mechanical portion.

A transport control unit 23 is provided for controlling a transport operation performed by such a disc transporting unit 24. This transport control unit 23 controls the transport operation of the disc transporting unit 24 on the basis of instructions given from the controller 22, thereby causing the disc transporting unit 24 to transport the optical discs D between an instructed housing slot Bin and an instructed deck.

An external data interface 21 is provided to perform data communication with external devices (in this case, the cart control device 3) connected thereto through an interface terminal Tio. Upon receiving transmission data from the controller 22, this external data interface 21 transmits this data to the cart control device 3 through the interface terminal Tio. The external data interface 21 also receives data transmitted from the cart control device 3 through the interface terminal Tio, and supplies the data to the controller 22.

The controller 22 controls the entire cart 2. For example, the controller 22 may be constituted by a microcomputer including a central processing unit (CPU), a read only memory (ROM), and a random access memory (RAM), and performs operations according to programs stored in the ROM, thereby controlling each unit.

For example, upon receiving a data file write command from the cart control device 3 through the external data interface 21, the controller 22 executes processing for controlling writing of the data file. More specifically, depending on the content of the data file write command given from the cart control device 3, the number assigned to a housing slot Bin that houses an optical disc D on which the data file is written and the number assigned to a deck to be used are instructed. The controller 22 gives the transport control unit 23 an instruction including the number information of the instructed housing slot Bin and the number information of the deck. In response to this instruction, the transport control unit 23 controls the operation of the disc transporting unit 23 so that the optical disc D is transported and loaded to the deck from the housing slot Bin instructed by this number information.

In addition, upon receiving a data file to be written transferred from the cart control device 3, the controller 22 supplies the data file to the deck identified by the instructed number information to cause the deck to perform a data file writing operation.

[Configurations of Recording Control Device]

Figure 3:
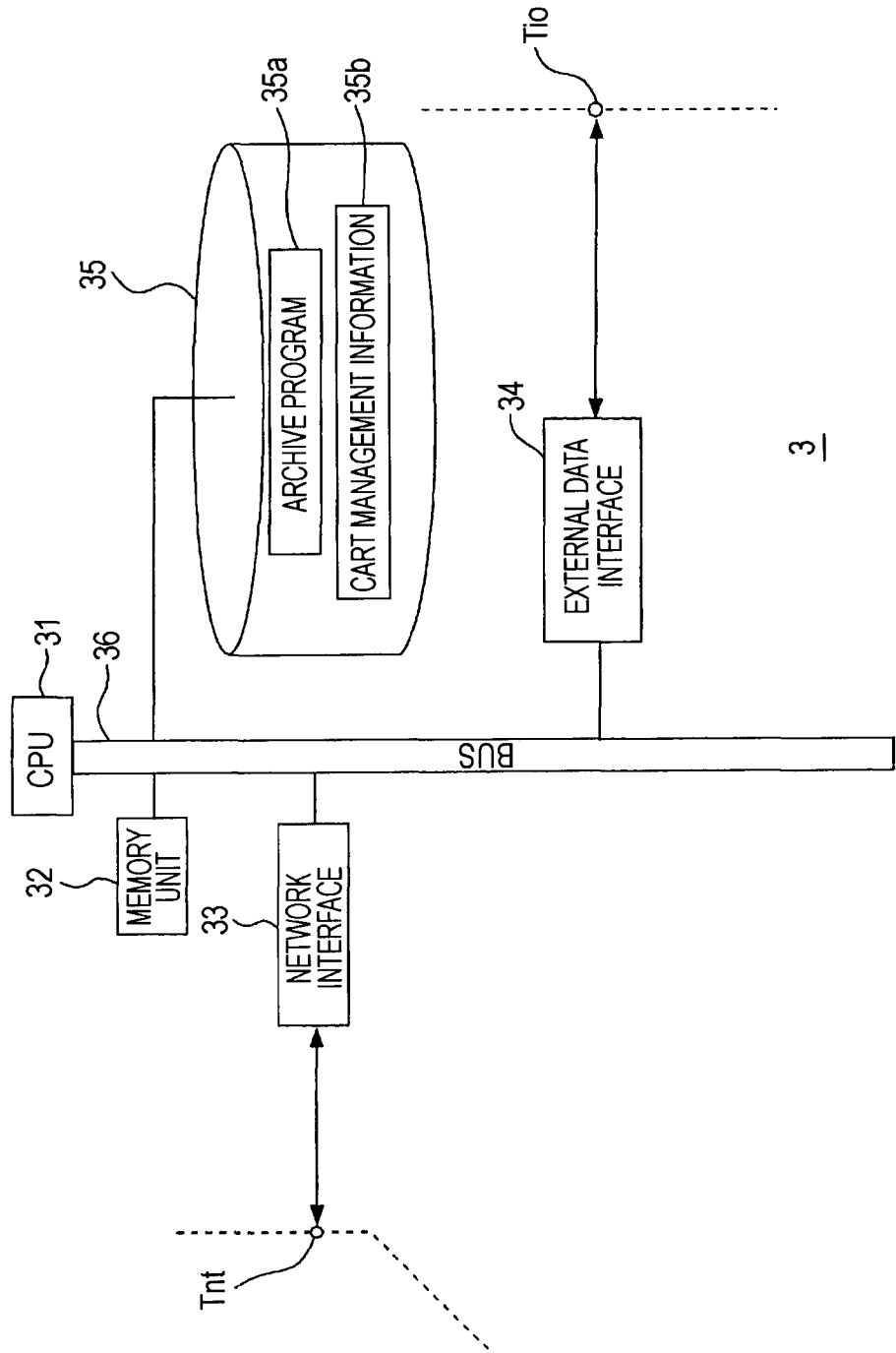
FIG. 3 is a block diagram illustrating an internal configuration of a recording control device according to an embodiment of the present invention.

FIG. 3 is a block diagram illustrating an internal configuration of the cart control device 3 shown in FIG. 1.

Referring to FIG. 3, a CPU 31 controls the entire cart control device 3 and executes arithmetic processing according to running programs. For example, the CPU 31 performs processing for storing data files in a hard disc drive (HDD) 35, for creating and updating management information, and for controlling the cart 2 connected thereto through an external data interface 34, which will be described later.

The CPU 31 exchanges control signals and data with each unit through a bus 36.

A memory unit 32 collectively indicates a ROM, a RAM, a flash memory, and the like used by the CPU 31 to execute processing. The ROM of the memory unit 32 stores programs for operating the CPU 31, a program loader, and so forth. The flash memory of the memory unit 32 stores various arithmetic coefficients, parameters used by programs, and so forth. Furthermore, a data area and a task area used for execution of programs are temporarily allocated in the RAM of the memory unit 32.

A network interface 33 is connected to the network 5, shown in FIG. 1, through a network terminal Tnt, and enables data communication with external devices (in this case, the PC 4 and the server 6) connected to the network 5.

The network interface 33 encodes transmission data and decodes reception data on the basis of the control of the CPU 31. The network interface 33 transmits the encoded transmission data to a predetermined external device through the network 5. In addition, the network interface 33 receives data transmitted from the external devices through the network 5, and supplies this data to the CPU 31.

The external data interface 34 is provided to perform data communication with external devices (in this case, the cart 2) connected thereto through an interface terminal Tio. Upon receiving transmission data from the CPU 31, the external data interface 34 transmits the transmission data to the cart 2 through the interface terminal Tio. In addition, the external data interface 34 receives data transmitted from the cart 2 through the interface terminal Tio, and supplies the data to the CPU 31.

Data files are stored and management information is created and updated on the HDD 35 on the basis of the control of the CPU 31 as described above. For example, the HDD 35 can temporary store a data file, e.g., an AV file F-av, transferred from the server 6 through the network interface 33.

In addition, the HDD 35 stores cart management information 35b regarding a housing location (e.g., information on the number assigned to each housing slot Bin) of each optical disc D housed in the disc housing unit 25 of the cart 2 and used for managing recorded data files.

Now, FIG. 6 shows a data structure of the cart management information 35b.

As shown in FIG. 6, in the cart management information 35b, pieces of information on a remaining capacity of a disc, a last access date, a housing location (e.g., a Bin number), a stored file name, and a category are associated with each disc ID.

The disc ID is information for identifying each individual optical disc D, and is unique to each optical disc D.

In addition, the information on the remaining capacity, the last access date, the housing location, the category, and the stored file name indicates, for each optical disc D, a remaining recordable capacity of the disc D, the date on which the last access (recording or playback) is made, information of the number assigned to a housing slot Bin that houses the optical disc D, a specified category, and a name of a recorded file, respectively.

In this embodiment, the disc ID information is recorded on each individual disc D using, for example, a barcode label.

In the cart 2 shown in FIG. 2, upon an optical disc D being newly housed in a housing slot Bin, the housing slot Bin scans a disc ID recorded in a barcode label attached to the optical disc D, and transfers the scanned disc ID to the controller 22. The controller 22, in turn, transfers, to the CPU 31 of the cart control device 3, the supplied disc ID and the number information (e.g., the Bin number) of the housing slot Bin that houses the optical disc D having this disc ID.

The CPU 31 adds the disc ID and the Bin number having been transferred in this way to the card management information 35b in association with each other. By performing such an operation, the CPU 31 of the cart control device 3 can grasp a correspondence between the optical disc D housed in the cart 2 and the housing location thereof.

In addition, every time the CPU 31 controls writing of a data file on an optical disc D housed in the cart 2, the CPU 31 updates information on the remaining capacity associated with the disc ID of the optical disc D on the basis of the size of the written data file. At the same time, the CPU 31 newly adds information on a name of the written file to the management information as the stored file name. In addition, the CPU 31 also updates information on the last access date associated with the disc ID of the optical disc D every time the optical disc D is accessed.

Additionally, information on a category detailed by the PC 4 at the time that the first writing operation of an AV file F-av on an optical disc D included in the cart 2 is performed by the CPU 31 is stored in association with the disc ID of the optical disc D as the category information, which will be described later.

The cart management information 35b, created and updated in this manner, allows the cart control device 3 to manage each piece of information about the remaining capacity of each optical disc D housed in the cart 2, the last access date, the housing location, and the category, and the stored file name.

Referring back to FIG. 3, the HDD 35 further stores an archive program 35a. The archive program 35a allows the CPU 31 to execute processing operations (see, FIGS. 11 and 12) for realizing operations according to an embodiment described below.

The archive program 35a may be stored in the memory unit 32.

The CPU 31 of the cart control device 3 shown in FIG. 3 manages data files recorded on each optical disc D and data files recorded on the HDD 35 using a directory structure under a root directory of a volume constituted by each optical disc D housed in the disc housing unit 25 of the cart 2 and the HDD 35 in the cart control device 3. In the directory structure, a directory representing each optical disc D and a directory representing the HDD 35 are formed.

Figure 8A:
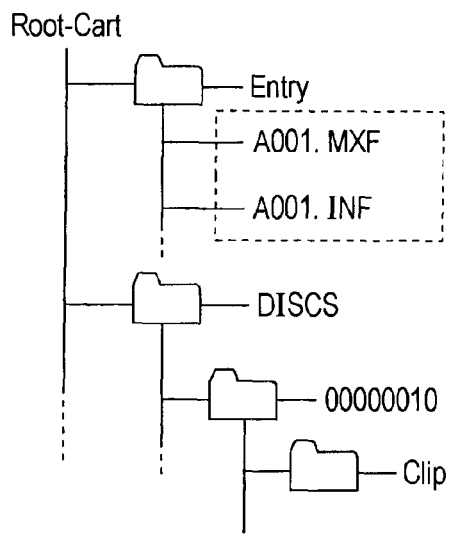
FIGS. 8A to 8C are diagrams illustrating operations performed by a recording system in response to writing of a specified data file through transition of data files stored on first recording media (i.e., a DISCS folder) and a second recording medium (i.e., an entry folder)

Such a directory structure is shown in FIG. 8A. Referring to FIG. 8A, a directory shown as an "Entry" folder corresponds to the one representing the HDD 35, whereas a directory (e.g., "00000010" in the figure) one-layer under a directory shown as a "DISCS" folder corresponds to the one representing each optical disc D.

By the cart control device 3 managing data files using the directory structure that assumes the HDD 35 and each optical disc D housed in the cart 2 as one volume, even the PC 4 connected to the cart control device 3 through the network 5 can recognize the directory structure under the root directory of one volume constituted by the HDD 35 and each optical disc D housed in the cart 2.

General personal computer also manages data files using the directory structure, thus the detailed description thereof is omitted here.

[Configurations of Information Processing Apparatus]

Figure 4:
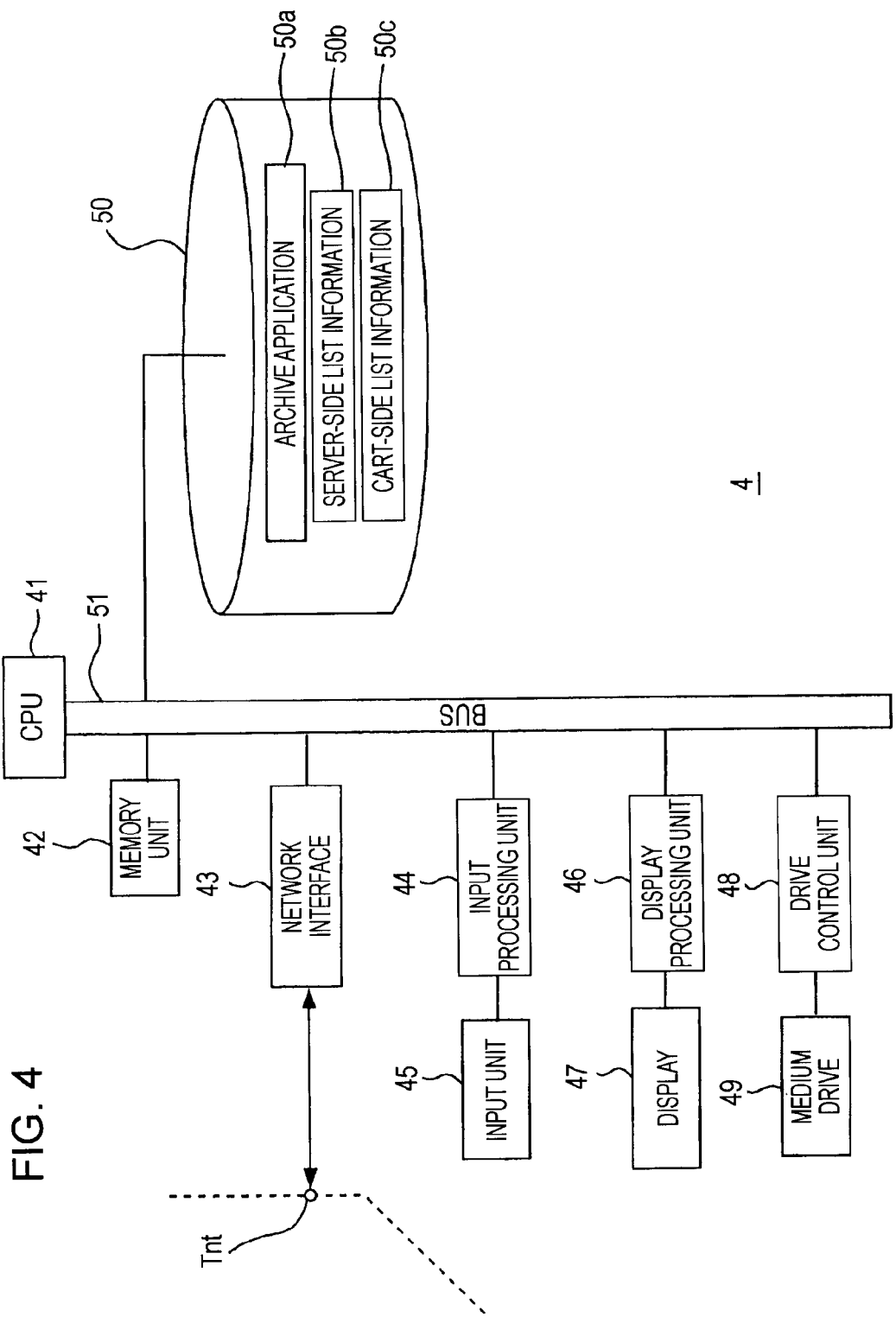
FIG. 4 is a block diagram illustrating an internal configuration of an information processing apparatus according to an embodiment of the present invention.

FIG. 4 is a block diagram illustrating an internal configuration of the PC 4 shown in FIG. 1.

Referring to FIG. 4, a CPU 41 controls the entire PC 4 and executes arithmetic processing on the basis of running programs. For example, the CPU 41 prompts users to perform input/output operations, stores data files on an HDD 50, and creates and updates management information.

The CPU 41 exchanges control signals and data with each unit through a bus 51.

A memory unit 42 collectively indicates a ROM, a RAM, a flash memory, and the like used by the CPU 41 to execute processing.

The ROM of the memory unit 42 stores programs for operating the CPU 41, a program loader, and so forth. The flash memory of the memory unit 42 stores various arithmetic coefficients, parameters used by programs, and so forth.

Furthermore, a data area and a task area used for execution of programs are temporarily allocated in the RAM of the memory unit 42.

A network interface 43 is connected to the network 5, shown in FIG. 1, through a network terminal Tnt, and enables data communication with external devices (in this case, the cart control device 3 and the server 6) connected to the network 5.

The network interface 43 encodes transmission data and decodes reception data on the basis of the control of the CPU 41. The network interface 43 transmits the encoded transmission data to a predetermined external device through the network 5. In addition, the network interface 43 receives data transmitted from the external devices through the network 5, and supplies this data to the CPU 41.

Data files are stored and management information is created and updated on the HDD 50 on the basis of the control of the CPU 41 as described above. For example, the HDD 50 can store a data file acquired from a predetermined medium by a medium drive 49, which will be described later.

In addition, programs for realizing various functions of the PC 4 can be stored in the HDD 50. In particular, in this embodiment, the HDD 50 stores an archive application 50*a* for allowing the PC 4 to function as a user interface unit of the archiving system 1. This archive application 50*a* includes programs for allowing the CPU 41 to execute processing operations (see, FIG. 10) for realizing an operation according to an embodiment, which will be described later.

Furthermore, the HDD 50 stores illustrated server-side list information 50*b* and cart-side list information 50*c*.

In the server-side list information 50*b*, at least names of AV files F-av stored in the server 6 are listed. The archive application 50*a* (and the CPU 41) creates and updates the list information. More specifically, upon being launched, the archive application 50*a* causes the CPU 41 to acquire at least information on names of AV files F-av stored in an HDD 65, which will be described later, from the server 6, and to create or update the server-side list information 50*b* on the basis of this information.

The archive application 50*a* also causes the CPU 41 to create and update the cart-side list information 50*c*. The creation and update of this cart-side list information 50*c* will be described below.

An input unit 45 may be an input device such as a keyboard, a mouse, or a remote commander, that is equipped with the PC 4. The input unit 45 allows users to perform various input operations and to input data. Information input with the input unit 45 undergoes predetermined processing performed by an input processing unit 44, and supplied to the CPU 41 as the input of operation or of data. The CPU 41, in turn, executes arithmetic processing and control processing according to the supplied information.

The medium drive 49 is a unit functioning as a drive compatible with an optical disc recording medium, such as, for example, a compact disc (CD), a mini disc (MD, a magneto-optical disc), a CD-R (recordable), CD-RW (rewritable), a digital versatile disc (DVD), a DVD-R, a DVD-RW, or a Blu-ray disc®, or a recording medium, such as a memory card (i.e., a removable semiconductor memory). The media drive 49 is capable of performing record and playback operations regarding such a medium. For example, when the medium drive 49 is compatible with an optical disc recording medium, the medium drive 49 includes, for example, an optical head, a spindle motor, a reproduced signal processing unit, and a servo circuit.

A drive control unit 48 controls record and playback operations and access operations performed on a medium loaded to the media drive 49. For example, in response to a user playback operation on a loaded medium input through the input unit 45, the CPU 41 instructs the drive control unit 48 to play back contents on the medium. The drive control unit 48, in turn, performs a control operation to allow the medium drive 49 to perform an access operation or a playback operation. The medium drive 49 transfers the read data to the drive control unit 48, and the drive control unit 48 sends the data to the bus 51.

A display 47 is a display device, such as, for example, a liquid crystal display. The display 47 displays various kinds of information to users.

For example, upon the CPU 41 supplying display data to a display processing unit 46 according to various operational states, input states, and communication states, the display processing unit 46 drives the display 47 on the basis of the supplied display data to cause the display 47 to execute a display operation.

In addition, in response to playback of video data from a medium loaded to the medium drive 49 or from the HDD 50, the display processing unit 46 controls and drives the display 47 on the basis of playback data to display the video.

[Configurations of Server]

Figure 5:
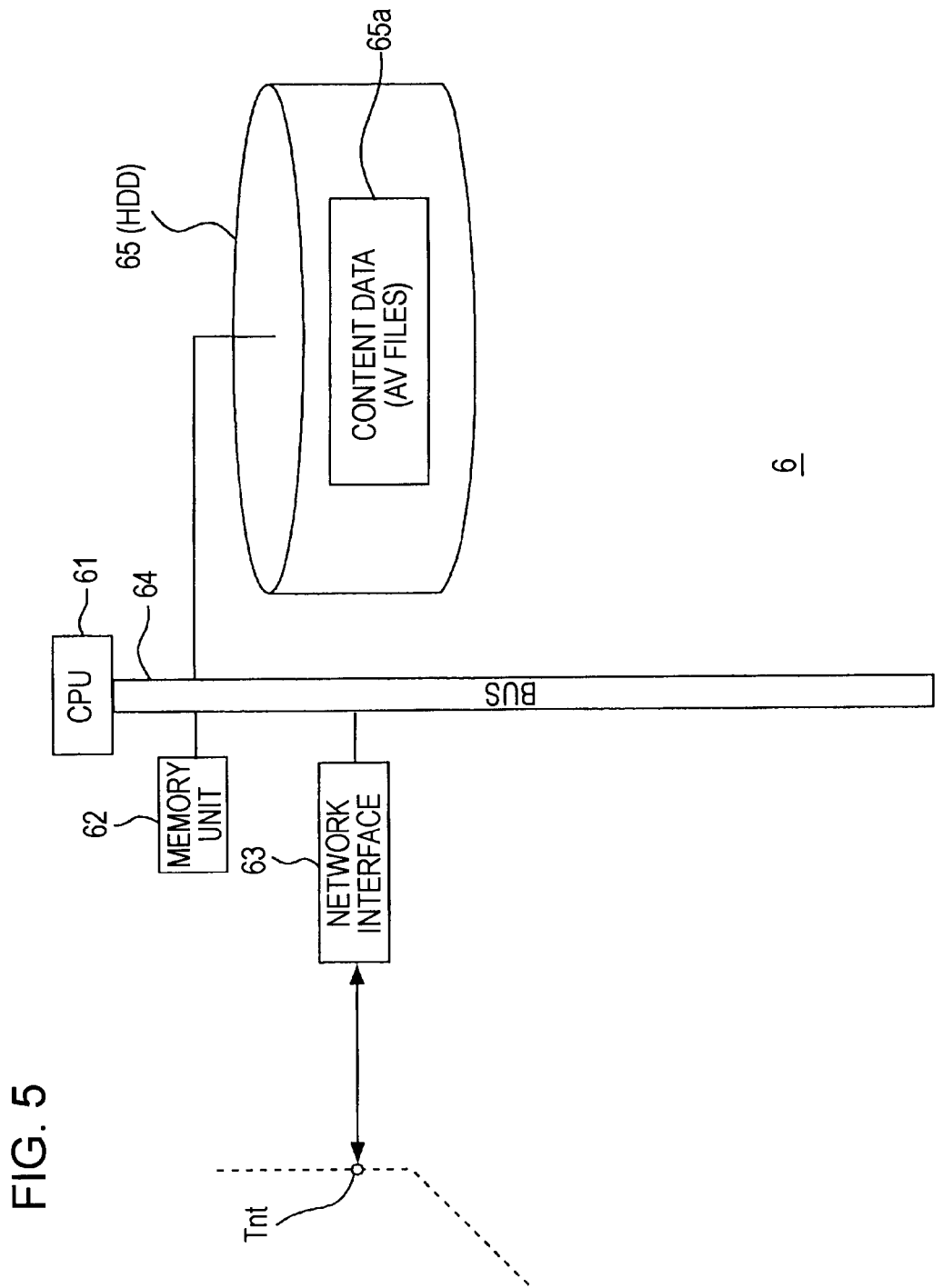
FIG. 5 is a block diagram illustrating an internal configuration of a server (i.e., an external storage device)

FIG. 5 is a block diagram illustrating an internal configuration of the server 6 shown in FIG. 1.

A CPU 61 controls the entire server 6 and executes arithmetic processing on the basis of running programs. For example, the CPU 61 prompts users to perform input/output operations, stores data files on an HDD 65, and creates and updates management information.

The CPU 61 exchanges control signals and data with each unit through a bus 64.

A memory unit 62 collectively indicates a ROM, a RAM, a flash memory, and the like used by the CPU 61 to execute processing. The ROM of the memory unit 62 stores programs for operating the CPU 61, a program loader, and so forth. The flash memory of the memory unit 62 stores various arithmetic coefficients, parameters used by programs, and so forth.

Furthermore, a data area and a task area used for execution of programs are temporarily allocated in the RAM of the memory unit 62.

A network interface 63 is connected to the network 5, shown in FIG. 1, through a network terminal Tnt, and enables data communication with external devices (particularly, in this case, the cart control device 3 and the PC 4) connected to the network 5. The network interface 63 encodes transmission data and decodes reception data on the basis of the control of the CPU 61. The network interface 63 transmits the encoded transmission data to a predetermined external device through the network 5. In addition, the network interface 63 receives data transmitted from the external devices through the network 5, and supplies this data to the CPU 61.

Data files are stored and management information is created and updated on the HDD 65 on the basis of the control of the CPU 61 as described above. For example, the HDD 65 can store a data file, e.g., an AV file F-av, transferred from external devices through the network interface 63. In the figure, the AV files F-av stored in the HDD 65 in such a manner are shown as content data 65a.

As mentioned before, the archiving system 1 according to this embodiment is a business system the use of which by broadcasters or other parties is assumed. To cope with this assumption, it is assumed that AV files F-av are so-called material exchange format (MXF) files in this case.

[Operations according to Embodiments]

As in the case of a known system, the archiving system 1 having the above-described configurations performs an operation to record a file specified from AV files F-av stored in the server 6 on a predetermined optical disc D housed in the cart 2. Regarding such a operation to record files on optical discs D housed in the cart 2, in the archiving system 1 according to the embodiment, a function for recording AV files F-av after categorizing the files into predetermined categories is added to functions of the known system as an additional function.

Operations realized by the archiving system 1 according to an embodiment will be described below.

A procedure of a user operation for specifying an AV file F-av to be recorded on an optical disc D and for specifying a category of the AV file F-av will be described first with reference to FIGS. 7A to 7D.

As mentioned before, in the archiving system 1, the PC 4 realizes a user interface allowing users to specify an AV file F-av to be recorded on an optical disc D. More specifically, users specify an AV file F-av to be recorded on an optical disc D and a category of the AV file F-av utilizing a graphical user interface (GUI) realized by the archive application 50a of the PC 4.

FIGS. 7A to 7D show an example of transition of GUI screens displayed on the display 47 shown in FIG. 4 in order to allow users to specify such an AV file F-av and a category of the AV file F-av.

Firstly, to trigger execution of an operation for recording an AV file F-av, users perform a predetermined operation on the PC 4 to launch the archive application 50a. The users then perform an operation according to the content of the screen displayed in response to the launch, thereby causing the PC 4 to display an archive file specification screen shown in FIG. 7A.

Figure 7A:
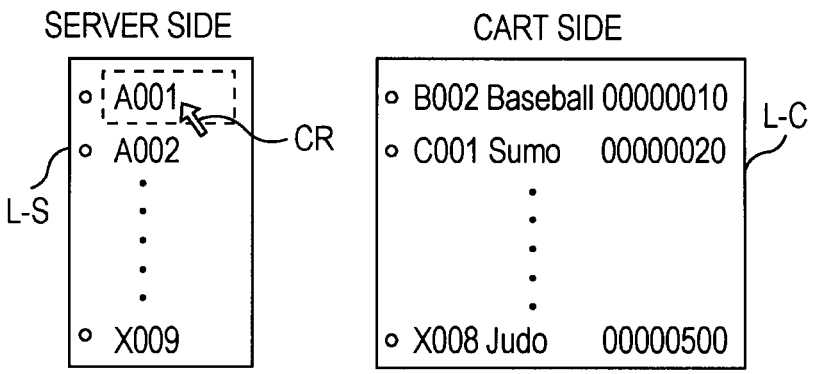
FIGS. 7A to 7D are diagrams illustrating an example of transition of GUI screens displayed by an information processing apparatus to explain a procedure of a user operation for specifying a data file to be written and a category of the data file.

Referring to FIG. 7A, a server-side list L-S and a cart-side list L-C are displayed in the archive file specification. In the server-side list L-S, file names of AV files F-av stored in the server 6 are listed. In the cart-side list L-C, a file name and a category name of each AV file F-av recorded on an optical disc D housed in the cart 2, and a disc ID of the optical disc storing the AV file F-av are listed. Furthermore, a cursor CR allowing users to select a file from these lists is also displayed.

The server-side list L-S is displayed on the basis of the content of the server-side list information 50b shown in FIG. 4, whereas the cart-side list L-C is displayed on the basis of the content of the cart-side list information 50c.

On this archive file specification screen, users can select a file name listed on the server-side list L-S by performing an operation on a mouse of the input unit 45, described with reference to FIG. 4, to move the cursor CR. That is, the users can select an AV file F-av having the file name.

Figure 7B:
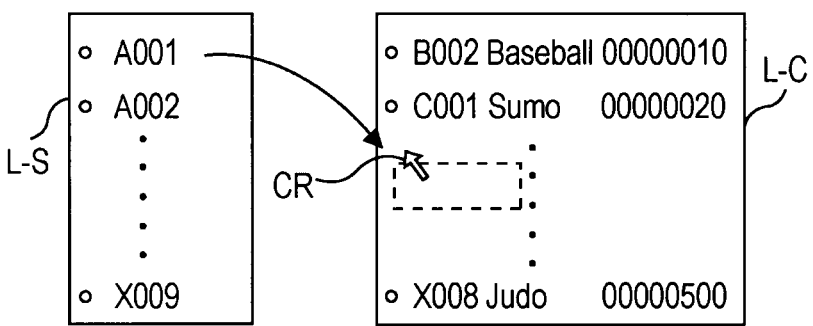

After selecting a predetermined AV file F-av from the server-side list L-S in this manner, the users then perform a drag and drop operation on the selected AV file F-av so as to move an indicator of the selected file to the cart-side list L-C as shown in FIG. 7B, thereby being able to instruct recording of the selected AV file F-av on an optical disc D housed in the cart 2.

More specifically, users perform an operation to move the mouse while pressing, for example, a left-click button of the mouse with the AV file F-av being selected so as to move the cursor CR to an area displaying the cart-side list L-C. The users then perform an operation to release the left-click button.

Herein, it is assumed that an instruction for recording a file, having a name "A001", stored in the server 6, on an optical disc D is given as shown in FIG. 7B.

Figure 7C:
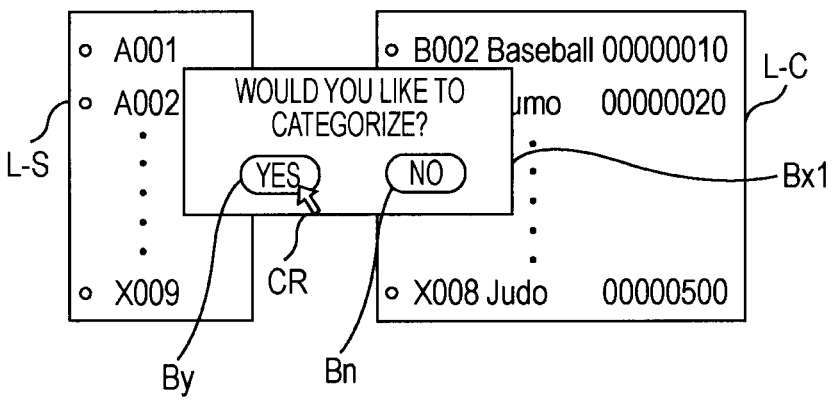

In response to the file write instruction from the server 6 to the optical disc D housed in the cart 2 after performing the drag and drop operation to move the AV file F-av selected from the server-side list L-S to the cart-side list L-C in this manner, the PC 4 displays a question box Bx1 shown in FIG. 7C.

As shown in FIG. 7C, in this question box Bx1, not only a message, such as "Would you like to categorize?", that asks users whether or not to specify a category of the write-instructed file but also buttons B that allow users to answer the question, such as a "YES" button By and a "NO" button Bn, are displayed.

Also in this case, the users can select one of the buttons B, i.e., the "YES" button By or the "NO" button Bn, by operating the mouse to move the cursor CR. The users can then set the content of the selected button B by pressing, for example, the left-click button with one of the buttons B being selected.

Figure 7D:
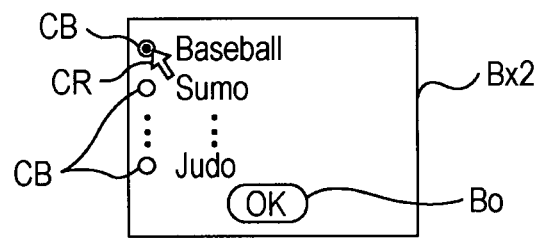

If the "YES" button By is selected and set and a decision to categorize the file is made, the PC 4 displays a category selection box Bx2 shown in FIG. 7D. In this category selection box Bx2, category names, check boxes CB for allowing users to select the categories, and an "OK" button Bo for allowing users to set the selected category are displayed.

The users can cause a check mark (e.g., a black dot in FIG. 7D) to be displayed in the check box CB by pressing a left-click button after moving, through a mouse operation, the cursor CR to a check box CR showing a category name to be specified. That is, by means of this operation, the users can select the category name. The users can specify the selected category name by pressing the left-click button after placing, through a mouse operation, the cursor CR over the "OK" button Bo with the predetermined category name being selected.

Herein, it is assumed that a category name of "Baseball" is selected and specified as shown in FIG. 7D.

In response to specification of a category of the write-specified file in this manner, an operation to record the specified AV-file F-av on an optical disc D associated with the specified category is performed.

Figure 8B:
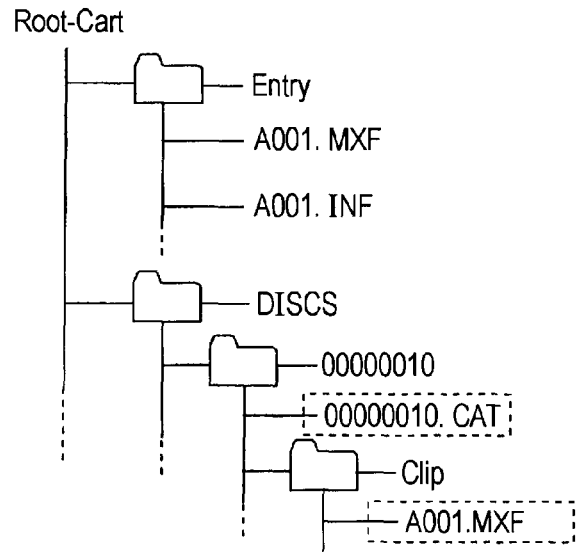
Figure 8C:
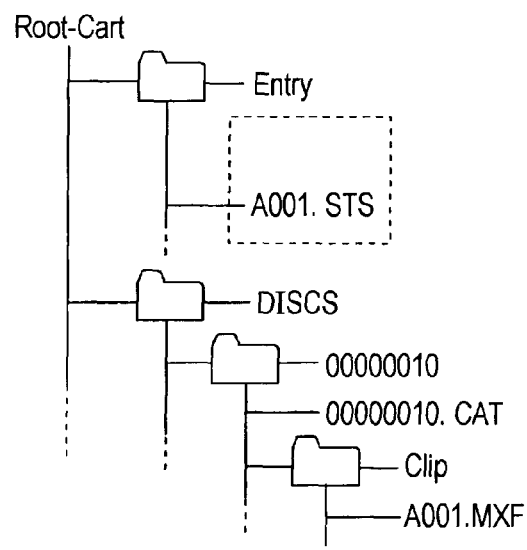

FIGS. 8A to 8C are diagrams illustrating operations performed by the archiving system 1 at the time of recording of such a specified file through transition of data files stored in the HDD 35 of the cart control device 3 and on the optical discs D of the cart 2.

Referring to FIG. 8A, in response to specification of the category performed as described above, the PC 4 (more specifically, the CPU 41) performs an operation to write the write-specified AV file F-av and an information file (hereinafter, referred to as an INF file) for detailing the specified category and the file name in an entry folder.

More specifically, the PC 4 instructs the server 6 to transfer the write-specified AV file F-av to the cart control device 3. The PC 4 also instructs the cart control device 3 to write the AV file F-av transferred from the server 6 on the HDD 35. In addition, in parallel to the operation to write the write-specified file in the entry folder, the PC 4 creates an INF file for detailing category information that indicates the category name selected and specified in the category selection box Bx2, and transfers the INF file to the cart control device 3, thereby instructing the cart control device 3 to write the INF file on the HDD 35.

Through such operations, as shown by an area enclosed by a broken line in FIG. 8A, an write-specified AV file F-av having a file name "A001" in this case (i.e., "A001.MXF" in FIG. 8A) and an INF file (i.e., "A001.INF" in FIG. 8A) for detailing information on the category specified for the write-specified AV file F-av are created in the entry folder.

In this embodiment, INF files are named so that the name of the INF file includes the name of the write-specified AV file F-av, such as "A001.INF" shown in FIG. 8A. That is, with this configuration, the INF file can inform, through the information on the file name thereof, the cart control device 3 of the AV file F-av that the category information included therein is specified for.

On the other hand, the cart control device 3 (more specifically, the CPU 31) waits for data files to be written in the entry folder by external devices. Once the AV file F-av and the INF file are written in the entry folder, the cart control device 3 first acquires the category information specified for the write-specified AV file F-av from the INF file. More specifically, in this case, the category information of "Baseball" is acquired.

Thereafter, the cart control device 3 determines whether or not an optical disc D assigned to a category that matches the detailed category exists in the cart 2 on the basis of the acquired category information and the cart management information 35b shown in FIG. 3 (also in FIG. 6).

If the optical disc D having the matching category information does not exist, the cart control device 3 selects a given blank disc (an unrecorded optical disc D, including a disc D having undergone only initialization). The cart control device 3 then categorizes the optical disc D as the one belonging to the category detailed by the INF file. More specifically, in this categorization operation, a category file indicating the category information detailed by the INF file is written on the selected optical disc D, as shown by an area enclosed by a broken line in FIG. 8B.

More specifically, the cart control device 3 first selects a given blank optical disc D (or a disc ID) on the basis of, for example, the remaining capacity information of the cart management information 35b. The cart control device 3 then acquires the housing location information (i.e., the number information of the housing slot Bin) associated with the selected optical disc D (or the disc ID) from the cart management information 35b so that the category file for indicating the category information detailed by the INF file is written on the selected optical disc D. The cart control device 3 also gives the cart 2 an instruction including the acquired Bin number information and the number information of a predetermined deck, thereby controlling the instructed optical disc D to be loaded into the instructed deck (one of the decks 26-1 to 26-3). The cart control device 3 then transfers the category file to the cart 2 to instruct the cart 2 to write the category file on the optical disc D loaded to the specified deck.

Suppose that the arbitrarily selected blank disc is an optical disc D having a disc ID of "00000010". In this case, a file having, for example, a name of "00000010.CAT" is created as the category file. The category file is then written in, for example, a directory for the selected optical disc D (in this case, a directory represented by a "00000010" folder) as shown in FIG. 8B.

In addition, the above-described category operation is performed not only on the selected optical disc D in this manner but also on the cart management information 35b. More specifically, the cart control device 3 updates the cart management information 35b so that the category information detailed by the INF file is written as the category information associated with the selected disc ID in the cart management information 35b.

By associating the category information with the disc ID in the cart management information 35b, the cart 2 does not have to read out the category file recorded on each optical disc D when the cart control device 3 determines whether or not an optical disc D having the matching category information exists in the above-described manner.

After performing such a categorization operation, the cart control device 3 controls the cart 2 to record the AV file F-av written in the entry folder on the categorized optical disc D.

If the categorization operation is performed, the selected optical disc D has been already loaded into the specified deck as described above. Thus, the cart control device 3 transfers the AV file F-av written in the entry folder to the cart 2 so as to instruct the cart 2 to write the AV file on the loaded optical disc D.

Referring to FIG. 8B, the AV file F-av in the entry folder is written under a directory of a "Clip" folder, which is under a directory of the selected optical disc D (in this case, the disc ID thereof is "00000010"). Other than this example, the AV file can be written directly under the folder for the selected optical disc D, for example. The writing destination is not limited in particular as long as the destination is under the directory for the selected optical disc D.

On the other hand, for example, if an optical disc D assigned to a category matching the category detailed by the INF file exists in the cart 2, the cart control device 3 performs only processing for controlling the cart 2 so that the AV file F-av written in the entry folder is recorded on the optical disc D.

More specifically, the cart control device 3 gives the cart 2 an instruction including the housing location information (i.e., the number information of the housing slot Bin) associated with the selected disc ID having the matching category from the cart management information 35b and the predetermined deck number information, thereby controlling the cart 2 to load the optical disc D having the selected disc ID into the instructed deck. Thereafter, the cart control device 3 transfers the AV file F-av written in the entry folder to the cart 2, and instructs the cart 2 to records the AV file F-av on the optical disc D loaded to the specified deck.

In this manner, an AV file F-av written in an entry folder is recorded on an optical disc D selected on the basis of category information detailed by an INF file written in the same entry folder.

In response to the completion of recording of the AV file F-av on the selected optical disc D, the cart control device 3 deletes the AV file F-av and the INF file from the entry folder, and writes a status file (hereinafter, also referred to as an STS file) for the newly recorded AV file F-av in the entry folder, as shown in FIG. 8C.

This STS file details the disc ID of the optical disc D on which the AV file F-av is recorded.

More specifically, in response to the completion of recording of the AV file F-av written in the entry folder on the selected optical disc D, the cart control device 3 creates an STS file including information on the disc ID of the optical disc D (i.e., the optical disc D selected by the cart control device 3) on which the file is recorded. The cart control device 3 then writes the STS file created in this manner in the entry folder (i.e., the HDD 35).

The name of this STS file indicates the name of the recorded AV file F-av as shown in FIG. 8C. More specifically, for example, a name of "A001.STS" is given to the STS file corresponding to the file name of "A001" of the recorded AV file F-av.

By naming an STS file in this manner, the STS file can identify the AV file F-av that is recorded on the optical disc D having the disc ID detailed by the STS file.

After controlling writing of the AV file F-av and the INF file in the entry folder as described above, the PC 4 waits for the STS file to be written (or created) in the entry folder by the cart control device 3 in this manner.

In response to the creation of the STS file in the entry folder, the PC 4 acquires the disc ID information from this STS file, and adds this disc ID to the cart-side list information 50c in association with the file name and the category information specified on the GUI screens shown in FIGS. 7A to 7D.

That is, with this operation, the file name of the AV file F-av specified to be written this time, the category information specified for the AV file F-av, and the disc ID of the optical disc on which the AV file F-av is recorded are associated and added to the cart-side list information 50c.

On the basis of the cart-side list information 50c, whose content is updated in this manner, the PC 4 can grasp each AV file F-av recorded in the cart 2, category information of the AV file F-av, and a disc ID of an optical disc on which the AV file F-av is recorded.

Figure 9A:
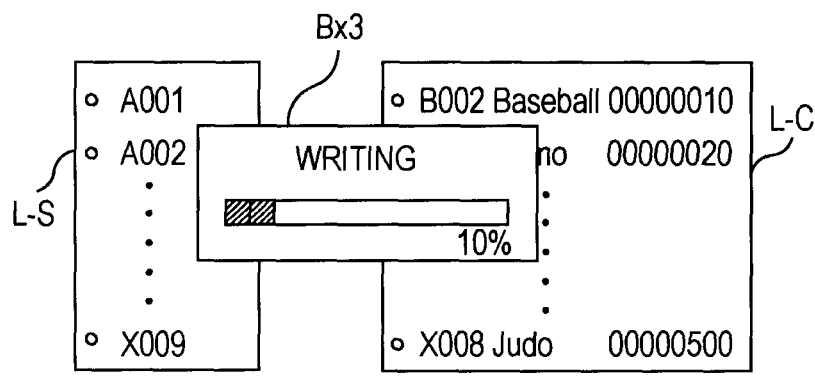
FIGS. 9A and 9B are diagrams illustrating example GUI screens displayed by an information processing apparatus after a category is selected and specified.
Figure 9B:
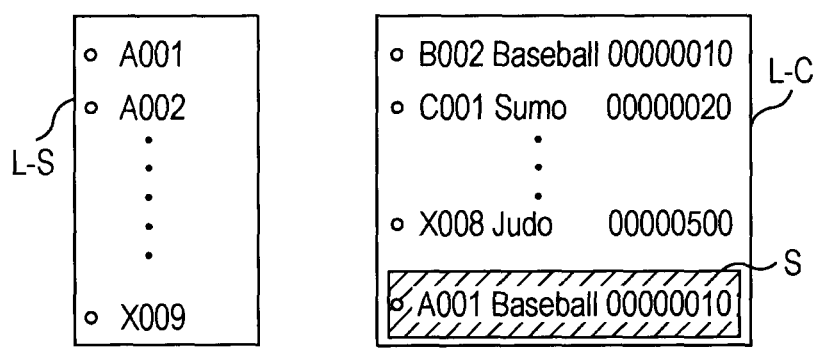

FIGS. 9A and 9B shows example GUI screens displayed by the PC 4 after the selection and specification of the category is made in the category selection box Bx2 shown in FIG. 7D.

A progress display box Bx3 shown in FIG. 9A is displayed on the display 47 during the transfer of the AV file F-av from the server 6 to the cart control device 3, the recording of the AV file F-av on the optical disc D, and the update of the cart-side list information 50c by the PC 4, described with reference to FIGS. 8A to 8C, after the selection and specification of the category. That is, the progress display box Bx3 informs users of progress of the recording operation.

In response to the update of the content of the cart-side list information 50c on the basis of the STS file created in the entry folder in the above-described manner, the PC 4 updates the content of cart-side list L-C displayed on the display 47 on the basis of the content of the cart-side list information 50c, as shown in FIG. 9B.

FIG. 9B shows an example of the update of the cart-side list L-C in a case where an optical disc D having a disc ID of "00000010" has been already categorized into a category of "Baseball", and an AV file F-av having a file name of "A001" that is specified in FIG. 7B is recorded on the optical disc D having the disc ID of "00000010". More specifically, in this case, a slot S in which the file name "A001", the category information "Baseball", and the disc ID "00000010" are associated with each other is added to the cart-side list L-C, as shown in FIG. 9B.

In the description given above, users may select and set the "NO" button Bn in the question box Bx1 shown in FIG. 7C and categorization of the write-specified file may not be performed. In such a case, the PC 4 creates category information of "non-specified category". More specifically, by creating such category information of "non-specified category", an arbitrarily selected optical disc D is categorized into the "non-specified category" if no optical disc D categorized into such a "non-specified category" exists in the cart 2. Thereafter, the specified AV file F-av is recorded on the categorized optical disc D.

If an optical disc D having been categorized into the "non-specified category" exists, the specified AV file F-av is recorded on the optical disc D.

In addition, in the description given above, it is assumed that the size of the write-specified AV file F-av does not exceed the recordable capacity of each optical disc D housed in the cart 2. However, if the size of the write-specified AV file F-av exceeds the recordable capacity of the optical disc D, the specified AV file F-av is divided and recorded on a plurality of optical discs D.

More specifically, in response to the AV file F-av and the INF file thereof being written in the entry folder, the cart control device 3 first checks the size of the written AV file F-av to determine whether or not the file is storable on one optical disc D. If the file is not storable on one disc, the cart control device 3 divides the AV file F-av written in the entry folder. At this time, the file is divided into the capacity of one optical disc D. For example, when the capacity of one optical disc D is 23 gigabytes (GB) and the size of the write-specified AV file F-av is 50 GB, the AV file F-av is divided so that sizes of divided files are 23 GB, 23 GB, and 4 GB.

After dividing the file, the cart control device 3 gives names to the divided files. The divided files are named so as to be able to identify the name of the original file in this case. More specifically, when the name of the original file is "A001", for example, hyphenated numerals are appended to the original file name, such as, "A001-1", "A001-2", . . . , "A001-n".

Furthermore, after such file division, the cart control device 3 selects the same number of given blank discs D as the number of divided files, and categorizes each of the selected optical discs D using the category information contained in the INF file written in the entry folder.

This categorization can be performed on all of the optical discs D using an identical deck. Alternatively, categorization can be performed on a plurality of optical discs D in parallel using a plurality of decks. The categorization method is not limited in particular as long as each of the selected optical discs D can be categorized using the category information contained in the INF file written in the entry folder.

Thereafter, the cart control device 3 controls the cart 2 to record the divided files on each of the categorized optical discs D. After the completion of recording of the divided files on each optical disc D, the cart control device 3 creates, for each divided file, an STS file that indicates the file name and the disc ID of the optical disc D on which the file is recorded. Also in this case, the STS file is created so that the name of the STS file includes the name of the file recorded on the optical disc D indicated by the disc ID detailed by the STS file. For example, when two divided files having names of "A001-1" and "A001-2" are created, names of "A001-1.STS" and "A001-2.STS" are given to the STS files thereof.

After creating the STS file for each divided file, the cart control device 3 writes a divided writing notification file in the entry folder together with these STS files. This divided writing notification file informs the PC 4 that the AV file is divided and recorded on a plurality of optical discs D.

On the other hand, in response to the divided writing notification file being written in the entry folder together with the STS files, the PC 4 acquires, for each divided file, file name information and disc ID information from the STS file. Thereafter, the PC 4 associates, for each divided file, the acquired file name information and disc ID information with the specified category information, and adds these pieces of information to the card-side list information 50c.

With this configuration, the PC 4 can correctly associate a disc ID of an optical disc D on which the file is recorded with category information thereof, and can add the information to the cart-side list information 50c, for each divided file.

In the description given above, the divided files are recorded on each of the optical discs D after selecting an optical disc D for each divided file and categorizing all of the optical discs D. However, the categorization and the recording of the divided file can be sequentially performed on each one of selected optical discs D.

Meanwhile, in the archiving system 1 according to the embodiment, when an AV file F-av to be written in the cart 2 and the category are specified and an optical disc D having been categorized into the same category already exists in the cart 2, the specified AV file F-av should be written on the optical disc D. However, in such a case, if the existing optical disc D does not have an enough remaining capacity, it may be impossible to record the specified AV file F-av on the optical disc D.

Accordingly, when optical discs D having been categorized into the same category already exist, the cart control device 3 checks the remaining capacity of the optical discs D belonging to the same category to determine whether or not there is an optical disc D capable of storing the specified AV file F-av.

If it is determined that there is no optical disc D having an enough remaining capacity to store the specified AV file F-av as a result of this determination, the cart control device 3 selects a given blank disc, categorizes the selected optical disc D based on the INF file, and controls recording of the AV file F-av.

On the other hand, if there is an optical disc D having an enough remaining capacity to store the specified AV file F-av, the cart control device 3 selects the optical disc D. If there is a plurality of such optical discs D, the cart control device 3 selects a given optical disc D from the plurality of discs. Thereafter, the cart control device 3 categorizes of the selected optical disc D based on the INF file, and controls recording of the AV file F-av.

With such operations, the write-specified AV file F-av can be written on the optical disc D when optical discs D having been categorized into a category the same as that specified for the write-specified AV file F-av exist and at least one optical disc D, among the plurality of discs D, having the enough remaining capacity to store the write-specified AV file F-av exists. That is, AV files F-av belonging to the same category can be recorded on optical discs D categorized into the same category as that of the AV files F-av.

As described above, in the archiving system 1 according to the embodiment, the cart control device 3 manages the data files recorded on each of the optical discs D and on the HDD 35 using a directory structure in which a directory representing each optical disc D and a directory representing the HDD 35 are formed under a root directory of a volume constituted by each optical disc D included in the cart 2 and the HDD 35 included in the cart control device 3.

The cart control device 3 sets the directory representing the HDD 35 in such a directory structure as an entry folder, which serves as an entry area of write-specified files. More specifically, in response to an AV file F-av and an INF file that details a category thereof being written (i.e., being registered) in the entry area by external devices (e.g., the PC 4), the cart control device 3 selects an optical disc D according to the category information detailed by the INF file, and controls the cart 2 so that the registered AV file F-av is recorded on this selected optical disc D.

According to this configuration, the PC 4 has only to write specified AV files F-av and INF files in a predetermined directory that serves as an entry folder in order to record the AV files F-av on a plurality of optical discs D housed in the cart 2 on a category-by-category basis. As a result, processing loads of the PC 4 can be reduced when compared with a case where, for example, the PC 4 selects optical discs D on which the AV files F-av are recorded according to the specified category information.

As is understandable from the foregoing description, since processing for selecting an optical disc D according to the category information involves processing for determining a category of each optical disc D and for confirming the remaining capacity thereof, an effect of the processing load reduction resulting from an omission of this selection processing is considerably large.

Additionally, in this embodiment, the cart control device 3 writes an STS file that details a disc ID of an optical disc D on which an AV file F-av registered in the entry folder is recorded in response to completion of recording of the registered AV file F-av on the selected optical disc D.

This allows the PC 4 to correctly grasp the optical disc D on which the write-instructed AV file F-av is recorded on the basis of the disc ID information detailed by this STS file.

In addition, the PC 4 stores (or adds the information to the cart-side list information 50c in fact) disc IDs acquired from STS files, file names of the write-specified AV files F-av, category information specified for the AV files F-av in association with each other. This allows the PC 4 to grasp categories that AV files F-av having been specified to be recorded in the cart 2 belong to and optical discs D that the AV files F-av are recorded.

Furthermore, in the embodiment, to instruct the archiving system 1 to record an AV file F-av on an optical disc D in the above-described manner is defined as to register an AV file F-av to be recorded into an entry folder. This allows the cart control device 3 to control the cart 2 so that the write-specified AV file F-av is correctly recorded on the optical disc D corresponding to the specified category, even when a plurality of PCs 4 are connected to the network 5 and instructions to record an AV file F-av and specification of a category are given to the cart control device 3 from each PC 4, for example.

In addition, in the embodiment, a file name of the write-instructed AV file F-av is included in the file name of the STS file, such as, for example, "A001.STS". This allows the PC 4 to correctly determine whether or not the STS file created in the entry folder is an STS file for the write-instructed file specified by the PC 4. That is, according to this configuration, even when writing instructions are given by a plurality of PCs 4 as described above, each of the PCs 4 can correctly determine whether or not the STS file created in the entry folder is the one for the write-instructed file specified by the corresponding PC 4. This prevents a circumstance that each PC 4 mistakenly acquires a disc ID of an optical disc D on which a write-instructed file specified by other PCs 4 recorded from occurring, and allows each PC 4 to correctly recognize an optical disc D on which the write-instructed file is recorded.

Additionally, in the embodiment, the registered AV file F-av and the INF file are deleted from the entry folder in response to the completion of recording of the write-instructed AV file F-av. This provides an advantage that the used capacity of the HDD 35 can be reduced.

Furthermore, in the embodiment, the PC 4 displays the category selection box Bx2 for allowing users to specify a category at the time of specification of an AV file F-av to be recorded on an optical disc D. This allows users to instruct writing of an AV file F-av with the specified category.

Moreover, the PC 4 displays the category information in association with the file name and the disc ID as a displayed content of the cart-side list L-C. This allows users to know the category of each file together with the disc ID of an optical disc D on which each file is recorded.

For example, it is expected that optical discs D on which AV files F-av are recorded by the cart 2 are moved to and kept in a data room or the like at a predetermined timing. Since the PC 4 can display a file name of each file, a disc ID of an optical disc D on which the file is recorded, and a category of the file as a list, users can manage, for each category, files recorded on the optical disc D kept in the data room on the basis of the content of the displayed list.

[Processing Operations]

Description will be given next to processing operations to be performed to realize the above-described operations of an archiving system 1 according to an embodiment of the present invention with reference to flowcharts shown in FIGS. 10 to 12.

Figure 10:
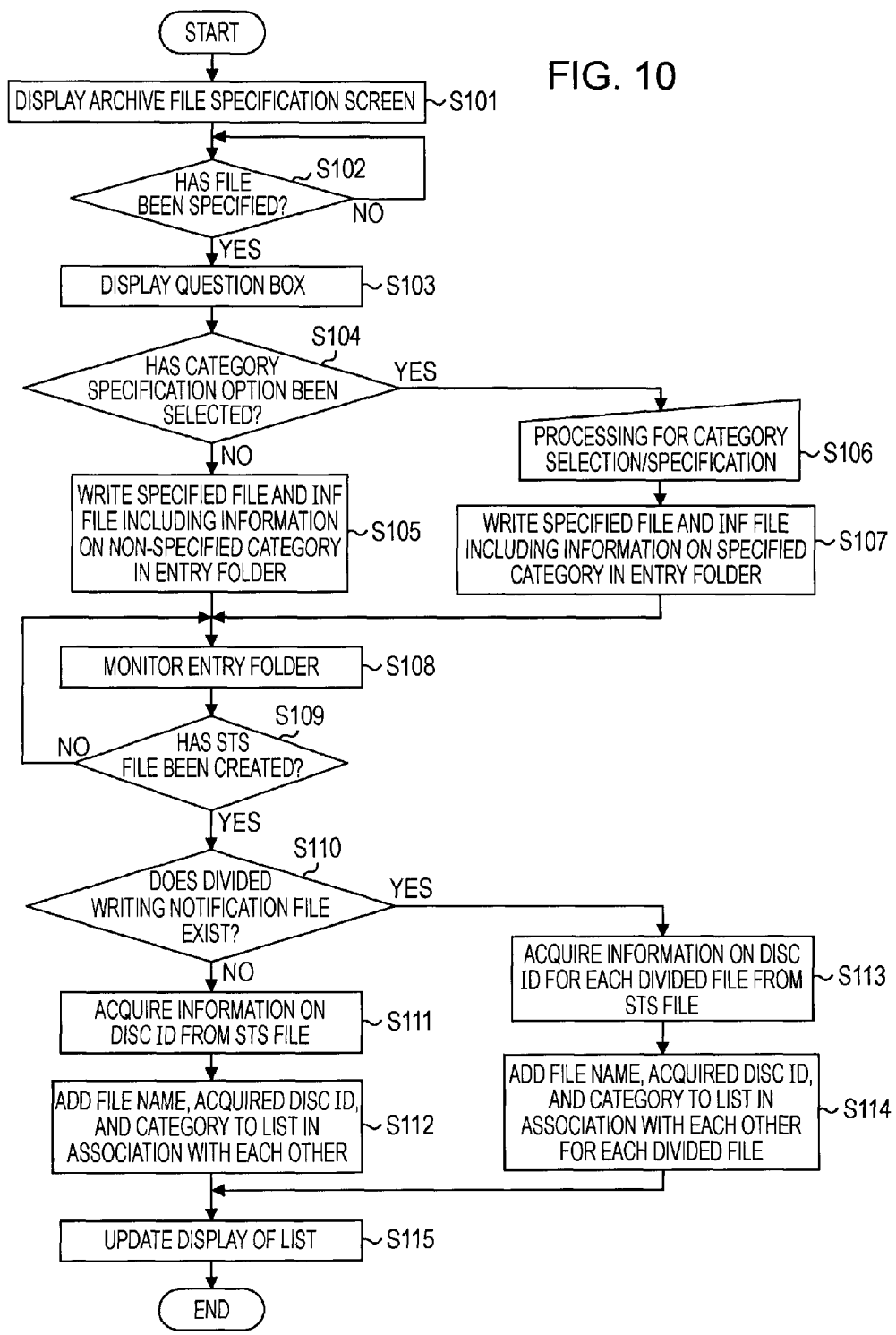
FIG. 10 is a flowchart illustrating processing operations to be executed by an information processing apparatus to realize operations of a recording system according to an embodiment of the present invention.

A CPU 41 shown in FIG. 4 executes a processing operation of a PC shown in FIG. 10 according to a part of programs of an archive application 50a. In addition, a CPU 31 shown in FIG. 3 executes a processing operation of a cart control device shown in FIGS. 11 and 12 according to an archive program 35a.

Figure 11:
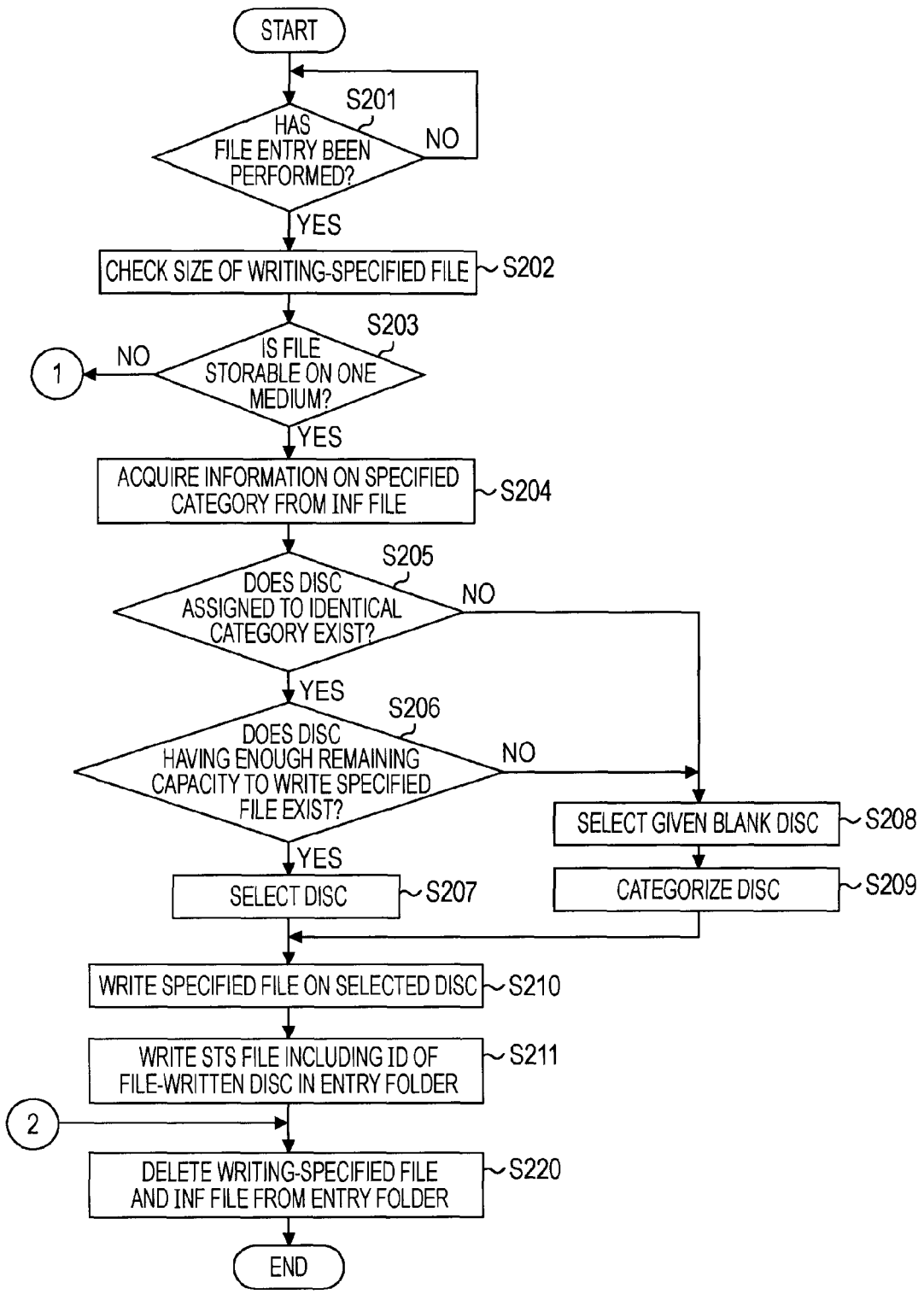
FIG. 11 is a flowchart illustrating processing operations to be executed by a recording control device to realize operations of a recording system according to an embodiment of the present invention.
Figure 12:
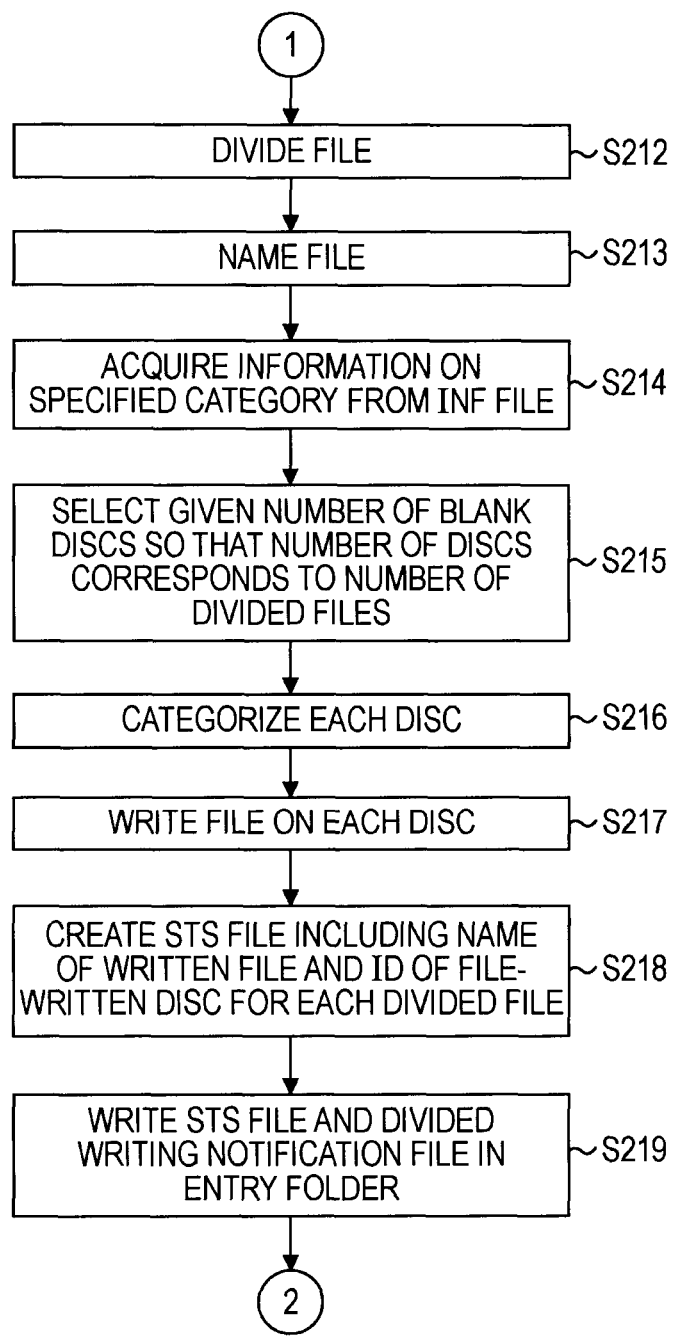
FIG. 12 is a flowchart illustrating processing operations to be executed, particularly when the size of a specified data file does not fit into a capacity of a first recording medium, by a recording control device to realize operations of a recording system according to an embodiment of the present invention.

Additionally, in FIGS. 10 to 12, a cart control device 3, a PC 4, and a server 6 are connected through a network 5 so as to be able to perform data communication. Similarly, the cart control device 3 and a cart 2 are connected so as to be able to perform data communication. Illustrated descriptions regarding processing operations executed by the cart 2 and the server 6 are omitted.

FIG. 10 shows a processing operation to be performed by the PC 4.

Firstly, at STEP S101, the PC 4 executes processing for displaying an archive file specification screen. More specifically, the CPU 41 supplies display data of an archive file specification screen shown in FIG. 7A to a display processing unit 46, and instructs the display processing unit 46 so that the archive file specification screen is displayed on a display 47.

At STEP S102, the PC 4 waits for a file to be specified.

According to the foregoing description, an AV file F-av to be recorded on an optical disc D housed in the cart 2 is specified by an operation to drag and drop an AV file F-av listed on a server-side list L-S to a cart-side list L-C displayed on the archive file specification screen. Thus, at STEP S102, the CPU 41 waits for such a drag and drop operation to be performed on the archive file specification screen displayed on the display 47.

If the above-described drag and drop operation is performed and a file is specified, the PC 4 executes processing for displaying a question box at STEP S103. More specifically, the CPU 41 supplies display data to the display processing unit 46, and instructs the display processing unit 46 to display a question box Bx1 shown in FIG. 7C.

At STEP S104, the PC 4 determines whether or not a category specification option is selected. More specifically, the CPU 41 determines whether or not an operation to select and set a "YES" button By in the question box Bx1, displayed in the above-described manner, is performed and an operation to specify a category is input.

At STEP S104, if the operation to select and set the "YES" button By is not performed (that is, an operation to select and set a "No" button Bn is performed) and category specification is not performed, the process proceeds to STEP S105. At STEP S105, the PC 4 executes processing for writing the specified file and an INF file, including category information for a non-specified category, in an entry folder. More specifically, the CPU 41 instructs the server 6 to transfer the AV file F-av, specified at STEP S102, to the cart control device 3 from the server 6. The CPU 41 also instructs the cart control device 3 to write, in an HDD 35, the AV file F-av transferred from the server 6 in this manner. Furthermore, in response to the input operation for not specifying the category, the CPU 41 creates an INF file including (detailing) the category information for the non-specified category. The CPU 41 then transfers the INF file to the cart control device 3 to instruct the cart control device 3 to write the INF file in the HDD 35.

At this time, a file name including information on a file name of the AV file F-av specified in the above-described manner is given to the INF file. This processing step also applies to STEP S107.

On the other hand, if the operation to select and set the "YES" button By is performed and an option to specify the category is selected at STEP S104, the process proceeds to STEP S106. At STEP S106, the PC 4 executes processing for selecting and specifying a category. More specifically, the CPU 41 supplies display data to the display processing unit 46 and instructs the display processing unit 46 to display a category selection box Bx2 shown in FIG. 7D on the display 47. The CPU 41 then performs processing for displaying a check mark in check boxes CB in this category selection box Bx2 in response to an input operation, and receives an operation to select and set an "OK" button Bo to receive specification of the category.

Subsequently, at STEP S107, the CPU 41 executes processing for writing the specified file and the INF file including specified category information in the entry folder. As in the case of STEP S105, at STEP S107, the CPU 41 instructs the server 6 to transfer the AV file F-av, specified at STEP S102, to the cart control device 3 from the server 6. The CPU 41 also instructs the cart control device 3 to write, in the HDD 35, the AV file F-av transferred from the server 6 in this manner. Thereafter, the CPU 41 creates an INF file including the category information representing the category specified at STEP S106. The CPU 41 then transfers the INF file to the cart control device 3 to instruct the cart control device 3 to write the INF file in the HDD 35 at STEP S107.

After executing processing at STEP S107 or S105, process proceeds to STEP S108.

At STEP S108, the CPU 41 executes processing for monitoring the entry folder. Then, at STEP S109, the CPU 41 determines whether an STS file is created or not. More specifically, at STEPs S108 and S109, the CPU 41 determines whether or not the STS file is created in the entry folder. If a negative result that the STS file is not created in the entry folder is obtained at STEP S109, the process returns to the monitoring processing at STEP S108.

If a positive result is obtained at STEP S109 and it is determined that the STS file is created in the entry folder, the process proceeds to STEP S110. At STEP S110, the CPU 41 determines whether or not a divided writing notification file exists.

If a negative result that the divided writing notification file does not exist in the entry folder is obtained at STEP S110, the process proceeds to STEP S111. After acquiring disc ID information from the STS file at STEP S111, the CPU 41 executes processing for adding the file name, the acquired disc ID, and the category to the list in association with each other at STEP S112. More specifically, at STEP S112, the CPU 41 executes processing for updating the content of the cart-side list information 50c so that the file name of the AV file F-av specified at STEP S102, the disc ID information acquired at STEP S111, and the category information are associated with each other and added to the cart-side list information 50c. In this case, the category information corresponds to the information regarding the non-specified category used at STEP S105 if the category is not specified at STEP S104, whereas the category information corresponds to the information regarding the category specified at STEP S106 if the category is specified.

The CPU 41 acquires, on the basis of the STS file created in the entry folder, the disc ID information of an optical disc D on which the write-specified AV file F-av is recorded at STEP S111 in the above-described manner. However, as described above, a case where a plurality of PCs 4 are connected to the network 5 and files are registered in the entry folder by the plurality of PCs 4 is also possible in the archiving system 1.

In such a case, each PC 4 determines, at STEP S111, whether the STS file is the one for the AV file F-av writing of which is specified by the corresponding PC 4 on the basis of the file name of the STS file created in the entry folder so as not to acquire wrong disc ID information from an STS file created for an AV file F-av writing of which is specified by other PCs 4. On the basis of this determination result, the PC 4 acquires the disc ID information from the STS file corresponding to the AV file F-av writing of which is specified by the corresponding PC 4.

This processing also applies to STEP S113, which will be described next.

On the other hand, if a positive result that the divided writing notification file exists in the entry file is obtained at STEP S110, the process proceeds to STEP S113. At STEP S113, the CPU 41 acquires the disc ID for each divided file from the STS files. Here, in the case where the divided writing notification file is created, the cart control device 3 divides the AV file F-av written in the entry folder at STEP S105 or S107, and creates STS files, each including file name information of the corresponding divided file and disc ID information of an optical disc D on which the divided file is recorded. At STEP S113, the CPU 41 acquires, from the plurality of STS files, the disc ID information included in each of the STS files.

Subsequently, at STEP S114, the CPU 41 executes, for each divided file, processing for adding the file name, the acquired disc ID, and the category information to the list in association with each other. More specifically, the CPU 41 executes, for each individual STS file, processing for updating the content of the cart-side list information 50c so that the file name and the disc ID information that are included in the STS file, and the category information are associated with each other and added to the cart-side list information 50c. In this case, the category information corresponds to the information regarding the non-specified category used at STEP S105 if the category is not specified at STEP S104, whereas the category information corresponds to the information regarding the category specified at STEP S106 if the category is specified.

After executing the processing at STEP S114 or S112, the process proceeds to STEP S115. At STEP S115, the CPU 41 executes processing for updating the displayed list. More specifically, the CPU 41 controls the display control unit 46 to update the content of the cart-side list L-C displayed on the display 47 on the basis of the content of the cart-side list information 50c that is updated in the above-described manner.

Although illustrated description is omitted, in parallel to the processing operation shown in FIG. 10, the CPU 41 controls the display control unit 46 to display a progress display box Bx3 shown in FIG. 9A on the display 47 after it is determined that the option to specify the category is not selected at STEP S104 or after the category is selected and specified at STEP S106. In addition, the CPU 41 also controls the display processing unit 46, until the displayed list is updated at STEP S115, so that an indication for detailing the progress of the recording operation is displayed in such a progress display box Bx3.

Now, FIGS. 11 and 12 shows a processing operation to be executed by the cart control device 3.

Referring to FIG. 11, at STEP S201, the cart control device 3 waits for files to be registered in the entry folder. More specifically, the CPU 31 waits for an AV file F-av and an INF file to be written in the HDD 35 and to be registered in the entry folder.

If the files are registered, the CPU 31 executes processing for checking the size of the write-specified file at STEP S202. More specifically, the CPU 31 acquires file size information from, for example, tag information of the write-specified AV file F-av that has been registered in the entry folder.

Subsequently, at STEP S203, the CPU 31 executes processing for determining whether or not the registered file can be stored on one optical disc D. If the size of the AV file F-av acquired at STEP S202 exceeds a predetermined value and a negative result that the file may not be stored on one optical disc D is obtained, the CPU 31 executes processing of STEP S212 and the following steps shown in FIG. 12. The processing operation shown in FIG. 12 will be described later.

If the size of the file acquired at STEP S202 does not exceed the predetermined value and a positive result that the file is recordable on one optical disc D is obtained at STEP S203, the process proceeds to STEP S204.

At STEP S204, the CPU 31 acquires the specified category information from the INF file.

Subsequently, at STEP S205, the CPU 31 executes processing for determining whether or not discs categorized into the same category as the specified category exist. More specifically, the CPU 31 determines whether or not optical discs D categorized into the matching category exist in the cart 2 on the basis of the acquired category information and the cart management information 35b.

If a positive result that discs of the matching category exist is obtained at STEP S205, the process proceeds to STEP S206. At S206, the CPU 31 executes processing for determining whether or not discs having an enough available capacity to record the specified file exist. More specifically, the CPU 31 determines whether or not optical discs capable of storing the write-specified AV file F-av exist on the basis of the file size information acquired at STEP S202 and the remaining capacity information regarding the optical discs D of the same category in the cart management information 35b.

If a negative result that storable optical discs D do not exist is obtained, the process proceeds to STEP S208, which will be described later.

If a positive result that storable optical discs D exist is obtained, the process proceeds to STEP S207. At STEP S207, the CPU 31 executes disc selection processing to select a storable optical disc D. As described before, when there are two or more storable optical discs D, the CPU 31 select given one of these discs.

After executing such disc selection processing, the processing proceeds to STEP S210, which will be described later.

Additionally, if a negative result that a category-matching disc does not exist is obtained at STEP S205, the process proceeds to STEP S208. The CPU 31 selects a given blank disc at STEP S208, and categorizes the selected blank optical disc D at STEP S209.

More specifically, at STEP S208, the CPU 31 selects a given blank disc from optical discs D housed in the cart 2 on the basis of the content (e.g., information on the remaining capacity and the existence or absent of stored files) of the cart management information 35*b*. As the categorization processing executed at STEP S209, the CPU 31 first controls the cart 2 (more specifically, a controller 22) to write, on the selected optical disc D, a category file, indicating the category information detailed by the INF file, under a directory representing the optical disc D as shown in FIG. 8B. At the same time, the CPU 31 also executes processing for updating the content of the cart management information 35*b* so that the category information detailed by the INF file is associated with the disc ID of the selected optical disc D in the cart management information 35*b*.

After executing the categorization processing at STEP S209, the process proceeds to STEP S210.

At STEP S210, the CPU 31 executes processing for recording the specified file on the selected disc.

More specifically, when the CPU 31 executes the processing of STEP S210 after categorizing the disc at STEP S209, the CPU 31 controls the cart 2 so that the write-specified AV file F-av is written by the deck at STEP S210 since the selected optical disc D has been already loaded into the instructed deck in the cart 2 at the time of the writing of the category file.

On the other hand, when the CPU 31 executes the processing of STEP S210 after executing only the selection of the optical disc D at STEP S207, the cart 2 has to transport and load the selected optical disc D to a predetermined deck. Accordingly, in this case, the CPU 31 first acquires the housing location information (i.e., the number information of the housing slot Bin) associated with the disc ID of the selected optical disc D from the cart management information 35*b*, and informs the cart 2 of this Bin number information and the number information of the predetermined deck, thereby controlling the cart 2 to transport and load the selected disc D to the instructed deck at STEP S210. Thereafter, the CPU 31 transfers the write-specified AV file F-av to the cart 2 and instructs the carts 2 to record the AV file F-av on the optical disc D loaded to the instructed deck.

In response to the completion of recording of the write-specified file on the selected optical disc D by executing such a writing operation, the CPU 31 writes an STS file, including the disc ID of the disc on which the file is recorded, in the entry folder at STEP S211. More specifically, the CPU 31 creates an STS file that includes and details the disc ID of the selected optical disc D, and writes the STS file in the entry folder.

As in the case of the INF file described above, a file name including the name of the written AV file F-av is given to this STS file, thus which can correctly represent a correspondence between the recorded AV file F-av and the optical disc D on which the AV file F-av is recorded.

Subsequently, at STEP S220, the CPU 31 executes processing for deleting the write-specified file and the INF file from the entry folder. More specifically, the CPU 31 deletes, from the HDD 35, the write-specified AV file F-av and the INF file written in the entry folder together with this AV file F-av.

FIG. 12 shows a processing operation to be executed when the negative result that the write-specified file is not storable on one disc is obtained at STEP S203.

Referring to FIG. 12, at STEP S212, the CPU 31 executes file division processing. More specifically, the CPU 31 executes processing for dividing the AV file F-av written in the entry folder. As described before, in this case, the file is divided into a capacity of one optical disc.

Subsequently, at STEP S213, the CPU 31 names each of the divided files. The name is given to each divided file so that the name of the original file can be identified. For example, a hyphenated numeral is appended to the original file name, as described above.

At STEP S214, the CPU 31 acquires the specified category information from the INF file written in the entry folder. At STEP S215, the CPU 31 selects as many blank discs as the number of divided files. Subsequently, at STEP S216, the CPU 31 executes categorization processing on each disc. More specifically, the CPU 31 executes the categorization processing on each of the selected blank optical discs D on the basis of the category information included in the INF file written in the entry folder. The content of the categorization processing executed on each optical disc D is the same as that performed at STEP S209.

Furthermore, at STEP S217, the CPU 31 executes processing for recording the file on each disc. More specifically, the CPU 31 controls the cart 2 to record each of the divided files created at STEP S212 on the corresponding categorized optical disc D.

In response to the completion of such recording of divided files on each optical disc D, the CPU 31 creates, for each divided file, an STS file including the recorded file name and the ID of the disc on which the file is recorded at STEP S218. More specifically, the CPU 31 creates, for each divided file, an STS file including the file name and the disc ID of the optical disc D on which the file is recorded.

Also in this case, a file name including the name of the written file is given to each STS file. More specifically, each STS file includes information on the file name of the corresponding divided file and on the disc ID of the optical disc on which the file is written.

Subsequently, at STEP S219, the CPU 31 writes the STS file and a divided writing notification file in the entry folder. After executing processing of STEP S219, the process proceeds to STEP S220 shown in FIG. 11.

[Modifications]

Although the embodiments of the present invention have been described above, the present invention should not be limited to the embodiments that have been described as the present invention.

For example, in the embodiments, the cart 2 and the cart control device 3 are configured as individual devices. However, the cart 2 and the cart control device 3 may be integrated. In such a case, the cart 2 may includes the network interface 33 included in the cart control device 3 instead of the external data interface 21, and additionally includes the HDD 35. Furthermore, the controller 22 executes the processing executed by the CPU 31 and the directory management of the data files recorded on the optical discs D and the HDD 35.

In addition, in the embodiments, a case where data files stored in the HDD 65 of the server 6 are recorded on optical discs D housed in the cart 2 has been illustrated. However, data files stored in, for example, the HDD 50 of the PC 4 can be recorded on the optical discs D. In such a case, the PC 4 can instruct the cart control device 3 to record the data file on the optical disc D by writing the write-specified data file and an INF file thereof in the entry file.

Additionally, in the embodiments, a case where a category file is written on an optical disc D when categorizing the optical disc D has bee illustrated. However, for example, the category file is not necessarily written on the optical disc D when management information used for managing the correspondence between each optical disc and the category thereof is created separately by, for example, storing the category information in association with the disc ID of the selected optical disc D in the cart management information 35*b* as is the case of the embodiments.

Furthermore, in the embodiments, a case where recording media housed in the cart 2 is optical disc recording media (i.e., optical discs D) has been illustrated. However, other recording media, such as, for example, magnetic tape recording media, can be used.

In addition, although a case where an HDD (i.e., the HDD 35) is used as a recording medium temporarily storing AV files F-av has been illustrated, another recording medium, such as, for example, a flash memory, can be used.

Moreover, in the embodiments, a data file that is specified to be recorded on an optical disc D is an AV file F-av, and the write-instructed AV file F-av is recorded on the optical disc D. However, the present invention can be preferably applied to a case where other data files, such as, for example, audio data files and image data files, are specified to be recorded.

It should be understood by those skilled in the art that various modifications, combinations, sub-combinations and alterations may occur depending on design requirements and other factors insofar as they are within the scope of the appended claims or the equivalents thereof.

What is claimed is:

1. A recording system including a recording device having a media housing unit capable of housing a plurality of first recording media and a recording unit configured to perform a recording operation on the first recording media, and an information processing apparatus, the recording system comprising:
   a recording control unit disposed outside of the information processing apparatus, the recording control unit being configured to
      manage data files on each of the first recording media and on a second recording medium under a root directory of a volume constituted by the first recording media housed in the media housing unit and the second recording medium to which a data file to be recorded on the first recording media is registered, the data files being managed using a directory structure including
         a directory representing each of the first recording media housed in the media housing unit and
         a directory, serving as an entry folder, representing the second recording medium,
      execute, in response to a predetermined data file and an information file for detailing category information of the data files being written in the entry folder, processing for selecting a predetermined first recording medium from the plurality of the first recording media housed in the media housing unit based on the category information detailed by the information file, and
      execute processing for controlling the recording device so that the data file written in the entry folder is recorded on the selected first recording medium; and
   an information processing control unit disposed in the information processing apparatus, the information processing control unit being configured to execute, in response to the predetermined data file and the category information of the data files being specified, processing for controlling a writing operation so that the specified data file and the information file for detailing the specified category information of the data files are written in the entry folder.

2. The recording system according to claim 1, wherein the category information of the data files is determined based on the content of the data files.

3. The recording system according to claim 1, wherein the recording control unit includes a cart management information unit that maintains information regarding a housing location associated with the selected predetermined first recording medium.

4. A recording method for a recording system including
   a recording device having a media housing unit capable of housing a plurality of first recording media and a recording unit configured to perform a recording operation on the first recording media,
   an information processing apparatus, and
   a recording control unit configured to manage data files on each of the first recording media and on a second recording medium under a root directory of a volume constituted by the first recording media housed in the media housing unit and the second recording medium to which a data file to be recorded on the first recording media is registered, the data files being managed using a directory structure including
      a directory representing each of the first recording media housed in the media housing unit, and
      a directory, serving as an entry folder, representing the second recording medium,
   the method comprising the steps of:
      selecting, via the recording control unit and in response to a predetermined data file and an information file for detailing category information of the data files being written in the entry folder, a predetermined first recording medium from the plurality of the first recording media housed in the media housing unit based on the category information detailed by the information file;
      controlling the recording device via the recording control unit so that the data file written in the entry folder is recorded on the selected first recording medium; and
      controlling, via the information processing apparatus and in response to the data file and the category information of the data files being specified, a writing operation so that the specified data file and the information file for detailing the specified category information of the data files are written in the entry folder.

5. An information processing apparatus included in a recording system that further includes
   a recording device having a media housing unit capable of housing a plurality of first recording media and a recording unit configured to perform a recording operation on the first recording media, and
   a recording control unit disposed outside of the information processing apparatus, the recording control unit being configured to
      manage data files on each of the first recording media and on a second recording medium under a root directory of a volume constituted by the first recording media housed in the media housing unit of the recording device and the second recording medium to which a data file to be recorded on the first recording media is registered, the data files being managed using a directory structure including
- a directory representing each of the first recording media housed in the media housing unit, and
- a directory, serving as an entry folder, representing the second recording medium, execute, in response to a predetermined data file and an information file for detailing category information of the data files being written in the entry folder, processing for selecting a predetermined first recording medium from the plurality of the first recording media housed in the media housing unit based on the category information detailed by the information file, and execute processing for controlling the recording device so that the data file written in the entry folder is recorded on the selected first recording medium, the information processing apparatus comprising:
an information processing control unit configured to execute, in response to the data file and the category information of the data files being specified, processing for controlling a writing operation so that the specified data file and the information file for detailing the specified category information of the data files are written in the entry folder.

6. The information processing apparatus according to claim 5, wherein the recording control unit further executes processing for controlling a writing operation so that a status file for detailing information for identifying the selected first recording medium is written in the entry folder, and wherein the information processing control unit further executes, in response to the status file being written in the entry folder, processing for storing the identification information detailed by the status file, a name of the specified data file, and the specified category information in association with each other.

7. The information processing apparatus according to claim 6, further comprising:
a display unit; and
an operation input unit,
wherein a data file stored in a predetermined external storage device is recorded on the first recording media housed in the media housing unit,
wherein the information processing control unit executes processing for controlling a display operation so that a first list showing a list of names of data files stored in the external storage device and a second list, showing a list of names of data files recorded on each of the first recording media housed in the media housing unit, in which identification information of the first recording medium storing the data file and the category information are associated with the name of each file, are displayed on the display unit,
wherein the information processing control unit executes, in response to an operation for moving a data file specified from the first list displayed on the display unit to the second list, processing for controlling a display operation so that a category selection screen allowing a user to specify category information of the specified data file is displayed on the display unit,
wherein the information processing control unit executes, in response to an operation for specifying the category information on the category selection screen, processing for controlling the writing operation so that the information file for detailing the specified category information and the specified data file are written in the entry folder, and wherein the information processing control unit executes, in response to the status file being written in the entry folder, processing for controlling an addition operation so that the identification information detailed by the status file, the specified category information, and the name of the specified data file are added to the second list in association with each other.

8. An information processing control method for a recording system that includes
a recording device having a media housing unit capable of housing a plurality of first recording media and a recording unit configured to perform a recording operation on the first recording media,
an information processing apparatus, and
a recording control unit disposed outside of the information processing apparatus, the recording control unit being configured to
manage data files on each of the first recording media and on a second recording medium under a root directory of a volume constituted by the first recording media housed in the media housing unit of the recording device and the second recording medium to which a data file to be recorded on the first recording media is registered, the data files being managed using a directory structure including
- a directory representing each of the first recording media housed in the media housing unit, and
- a directory, serving as an entry folder, representing the second recording medium, execute, in response to a predetermined data file and an information file for detailing category information of the data files being written in the entry folder, processing for selecting a predetermined first recording medium from the plurality of the first recording media housed in the media housing unit based on the category information detailed by the information file, and execute processing for controlling the recording device so that the data file written in the entry folder is recorded on the selected first recording medium, the method comprising the step of:
controlling, in response to the data file and the category information of the data files being specified, a writing operation so that the specified data file and the information file for detailing the specified category information of the data files are written in the entry folder.

9. A recording control device for controlling a recording device having a media housing unit capable of housing a plurality of first recording media and a recording unit configured to perform a recording operation on the first recording media, the recording control device comprising:
a recording control unit configured to
manage data files on each of the first recording media and on a second recording medium under a root directory of a volume constituted by the first recording media housed in the media housing unit and the second recording medium to which a data file to be recorded on the first recording media is registered, the data files being managed using a directory structure including
- a directory representing each of the first recording media housed in the media housing unit, and
- a directory, serving as an entry folder, representing the second recording medium, execute, in response to a predetermined data file and an information file for detailing category information of the data files being written in the entry folder, processing for selecting a predetermined first recording medium from the plurality of the first recording media housed in the media housing unit based on the category information of the data files detailed by the information file, and execute processing for controlling the recording device so that the data file written in the entry folder is recorded on the selected first recording medium.

10. The recording control device according to claim 9, wherein the recording control unit further executes processing for controlling a writing operation so that a status file for detailing information for identifying the selected first recording medium is written in the entry folder.

11. The recording control device according to claim 9, wherein the recording control unit manages at least category information of each of the first recording media housed in the media housing section, wherein the recording control unit executes, in response to the data file and the information file for detailing the category information of the data file being written in the entry folder, processing for selecting a predetermined first recording medium having category information matching the category information detailed by the information file from the plurality of the first recording media housed in the media housing unit, wherein the recording control unit executes processing for controlling the recording device so that the data file written in the entry folder is recorded on the selected first recording medium, and wherein the recording control unit executes processing for controlling a writing operation so that a status file for detailing information for identifying the selected first recording medium is written in the entry folder.

12. The recording control device according to claim 9, wherein the recording control unit manages category information and remaining capacity information of each of the first recording media housed in the media housing unit, wherein the recording control unit determines, in response to the data file and the information file for detailing the category information of the data file being written in the entry folder, whether or not a first recording medium having category information matching the category information detailed by information file exists, wherein if no first recording media having the matching category information exist, the recording control unit selects a blank first recording medium from the plurality of first recording media housed in the media housing unit, and executes processing for controlling the recording device so that the data file written in the entry folder is recorded on the selected first recording medium, whereas, if at least one first recording medium having the matching category information exists, the recording control unit determines whether a first recording medium capable of storing the data file written in the entry folder exists based on the remaining capacity information of the first recording medium, and wherein if no first recording media capable of storing the data file exist, the recording control unit selects a blank first recording medium from the plurality of first recording media housed in the media housing unit, and executes processing for controlling the recording device so that the data file written in the entry folder is recorded on the selected first recording medium, whereas, if at least one first recording medium capable of storing the data file exists, the recording control unit executes processing for controlling the recording device so that the data file written in the entry folder is recorded on a predetermined one of the first recording media capable of storing the data file.

13. The recording control device according to claim 9, wherein the recording control unit controls, in response to at least the data file written in the entry folder being recorded on the selected first recording medium, a deletion operation so that the data file and the information file are deleted from the entry folder.

14. A recording control method for a recording control device for controlling a recording device having a media housing unit capable of housing a plurality of first recording media and a recording unit configured to perform a recording operation on the first recording media, the recording control device including a recording control unit configured to
manage data files on each of the first recording media and on the second recording medium under a root directory of a volume constituted by the first recording media housed in the media housing unit and the second recording medium to which a data file to be recorded on the first recording media is registered, the data files being managed using a directory structure including
a directory representing each of the first recording media housed in the media housing unit and
a directory, serving as an entry folder, representing the second recording medium, the method comprising the steps of:
selecting, in response to a predetermined data file and an information file for detailing category information of the data files being written in the entry folder, a predetermined first recording medium from the plurality of the first recording media housed in the media housing unit based on the category information of the data files detailed by the information file; and controlling the recording device so that the data file written in the entry folder is recorded on the selected first recording medium.

* * * * *